United States Patent
Yano et al.

(10) Patent No.: US 10,828,929 B2
(45) Date of Patent: Nov. 10, 2020

(54) ELECTRONIC BOARD

(71) Applicant: SHARP KABUSHIKI KAISHA, Sakai (JP)

(72) Inventors: Hisamitsu Yano, Sakai (JP); Ramadhan Ismail, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/449,224

(22) Filed: Jun. 21, 2019

(65) Prior Publication Data

US 2020/0001645 A1  Jan. 2, 2020

(30) Foreign Application Priority Data

Jun. 28, 2018 (JP) ................................. 2018-123331

(51) Int. Cl.
*B43L 1/10* (2006.01)
*G06F 3/041* (2006.01)
*G06F 3/0354* (2013.01)

(52) U.S. Cl.
CPC ............ *B43L 1/10* (2013.01); *G06F 3/03546* (2013.01); *G06F 3/0412* (2013.01)

(58) Field of Classification Search
CPC ...... B43L 1/10; G06F 3/0412; G06F 3/03546; G06F 3/0488; G06F 2203/04106; G06F 3/0446; G06F 3/046; B43K 8/02
See application file for complete search history.

(56) References Cited

U.S. PATENT DOCUMENTS

| | | | | |
|---|---|---|---|---|
| 4,711,977 A * | 12/1987 | Miyamori | ............... | G06F 3/033 178/18.07 |
| 5,023,408 A * | 6/1991 | Murakami | .............. | G06F 3/033 178/18.07 |
| 6,011,545 A * | 1/2000 | Henderson | .............. | G06F 3/046 178/18.03 |
| 7,889,485 B2 * | 2/2011 | Cho | ......................... | H05K 5/02 248/460 |
| 10,754,453 B2 * | 8/2020 | Shirai | .................... | G06F 3/0383 |
| 2006/0214072 A1 * | 9/2006 | Lee | ........................ | F16M 13/02 248/200 |
| 2013/0038212 A1 * | 2/2013 | Yabuta | ................... | H05B 45/20 315/113 |
| 2013/0141664 A1 * | 6/2013 | Toyoyama | ................ | G09F 9/00 349/59 |

(Continued)

FOREIGN PATENT DOCUMENTS

JP         2004-188736 A         7/2004

*Primary Examiner* — Benyam Ketema
(74) *Attorney, Agent, or Firm* — ScienBiziP, P.C.

(57) ABSTRACT

An electronic board includes a writing board, a sensor sheet including X parallel electrode lines and Y parallel electrode lines, a chassis to which the sensor sheet is bonded, a corner reinforcement plate disposed on the rear side of the chassis and supporting the chassis, and a bezel. The writing board, the sensor sheet, and the chassis are successively disposed in the mentioned order and are fixed together into an integral sensor unit. The corner reinforcement plate includes a top surface portion, a first lateral surface portion, a second lateral surface portion, and a chassis retaining portion. The sensor unit is sandwiched between the chassis retaining portion and the bezel.

8 Claims, 28 Drawing Sheets

(56) References Cited

U.S. PATENT DOCUMENTS

| | | | |
|---|---|---|---|
| 2015/0241906 A1* | 8/2015 | Tsai | G06F 3/044 345/173 |
| 2015/0277179 A1* | 10/2015 | Nishi | G02B 6/0088 349/58 |
| 2017/0060346 A1* | 3/2017 | Park | G06F 3/0425 |

* cited by examiner

FIG. 6A

| IDENTIFIER TYPE | f0 (kHz) | WRITING COLOR |
|---|---|---|
| ID1 | 100 | BLACK |
| ID2 | 120 | BLUE |
| ID3 | 140 | GREEN |
| ID4 | 160 | YELLOW |
| ID5 | 180 | ORANGE |
| ID6 | 200 | RED |

FIG. 6B

| IDENTIFIER TYPE | f0 (kHz) | WRITING COLOR | THICKNESS OF PEN TIP | SHAPE OF PEN TIP |
|---|---|---|---|---|
| ID-a | 100 | BLACK | THIN | ● |
| ID-b | 105 | BLACK | THIN | ■ |
| ID-c | 110 | BLACK | THICK | ● |
| ID-d | 115 | BLACK | THICK | ■ |
| ID-e | 120 | BLUE | THIN | ● |
| ID-f | 125 | BLUE | THIN | ■ |
| ID-g | 130 | BLUE | THICK | ● |
| ID-h | 135 | BLUE | THICK | ■ |
| ID-i | 140 | GREEN | THIN | ● |
| ... | ... | ... | ... | ... |
| ID-u | 215 | RED | THICK | ● |

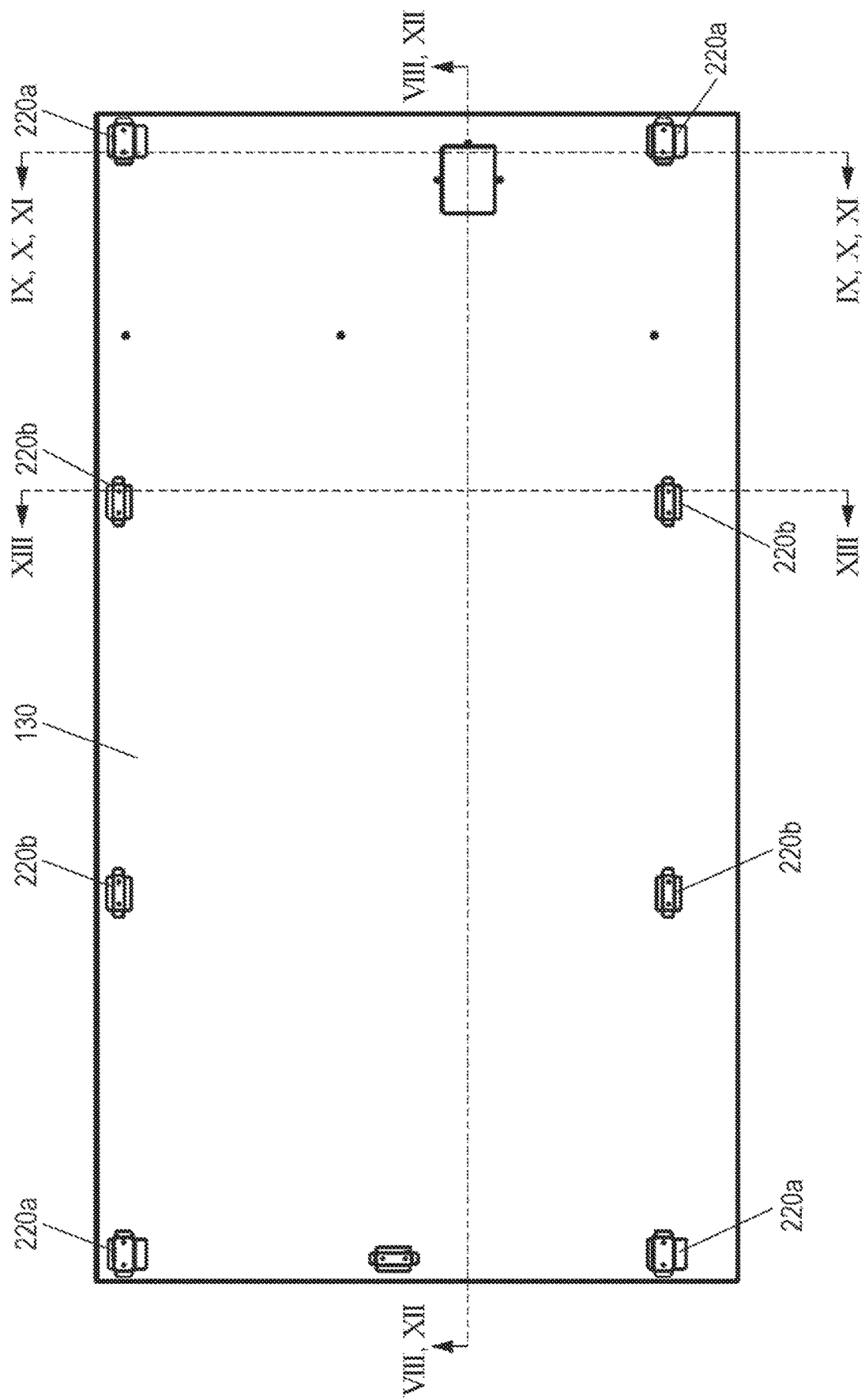

FIG. 9
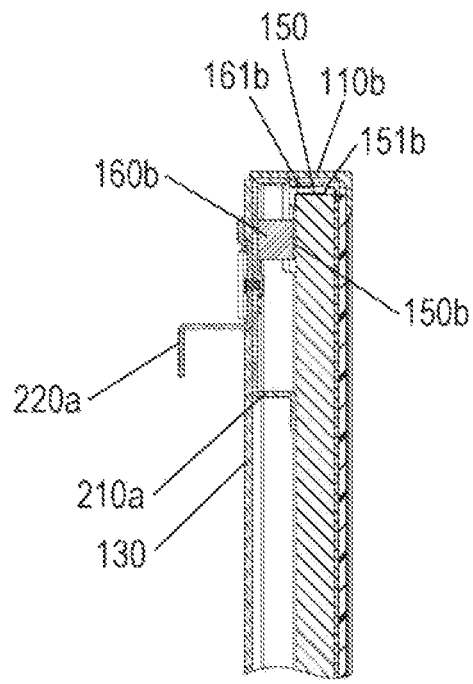
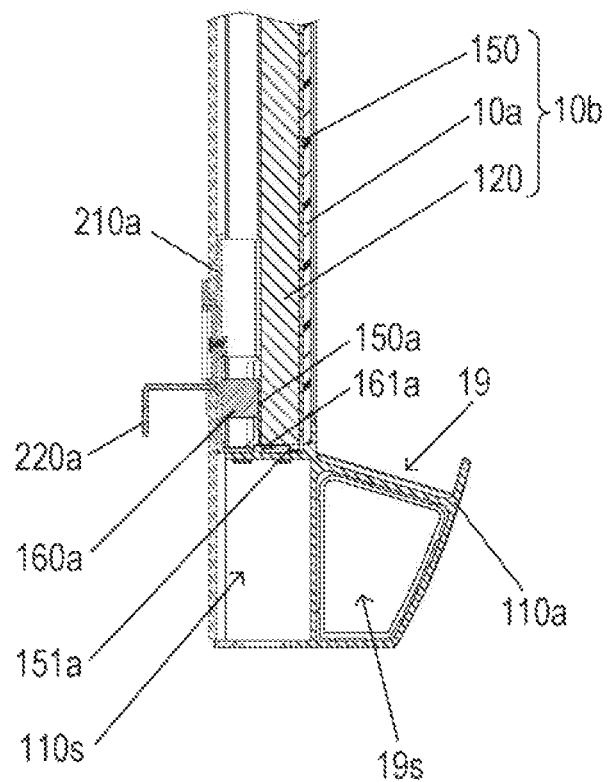

ELECTRONIC BOARD

BACKGROUND

1. Field

The present disclosure relates to an electronic board enabling handwriting of characters.

2. Description of the Related Art

Hitherto, an electronic board using a display equipped with a touch panel (i.e., a display electronic board) has been proposed. The display electronic board displays images corresponding to document data, picture data, etc. on a display screen, and further displays writing information, which is handwritten on a display screen with an electronic pen or the like, as images on the display screen. In addition, the display electronic board can store or print images displayed on the display screen and added with the writing information (see, e.g., Japanese Unexamined Patent Application Publication No. 2004-188736).

In the electronic board of related art, however, because of using a display that displays images on the basis of picture data, writing information, etc., the structure of the electronic board is complicated, and the cost is increased.

It is desirable to provide an electronic board capable of reducing the cost with a simple structure.

SUMMARY

According to an aspect of the disclosure, there is provided an electronic board detecting a contact position on a writing board, the electronic board including the writing board on which visually-recognizable handwriting remains by contact of a pen tip of a pen as a writing instrument with the writing board, a sensor sheet including a plurality of first electrode lines extending in a first direction and a plurality of second electrode lines extending in a second direction that intersects the first direction, a chassis fixedly holding the sensor sheet, a support member disposed on the rear side of the chassis and supporting the chassis, and a bezel constituting an outer frame of the electronic board, wherein the writing board, the sensor sheet, and the chassis are successively disposed in the mentioned order and are fixed together into an integral unit, wherein the support member includes a top surface portion, a lateral surface portion extending from the top surface portion toward a rear surface of the chassis and fixedly screwed to the bezel, and a chassis retaining portion held in contact with the rear surface of the chassis, and wherein the writing board, the sensor sheet, and the chassis formed into the integral unit are sandwiched between the chassis retaining portion and the bezel.

BRIEF DESCRIPTION OF THE DRAWINGS

FIGS. 6A and 6B are each an explanatory view illustrating an example of definition representing correspondence between resonance frequencies and attributes of a pen in the writing input system according to the embodiment of the present disclosure;

FIG. 7 is a rear view looking, from the rear side, the electronic board according to the embodiment of the present disclosure;

FIG. 9 illustrates parts (upper end portion and lower end regions) of a section taken along a line IX,X,XI-IX,X,XI in FIG. 7;

DESCRIPTION OF THE EMBODIMENTS

The present disclosure will be described below with reference to the drawings. It is to be noted that the following description is merely illustrative in all respects and is not to be construed as limiting the present disclosure.

Figure 1:
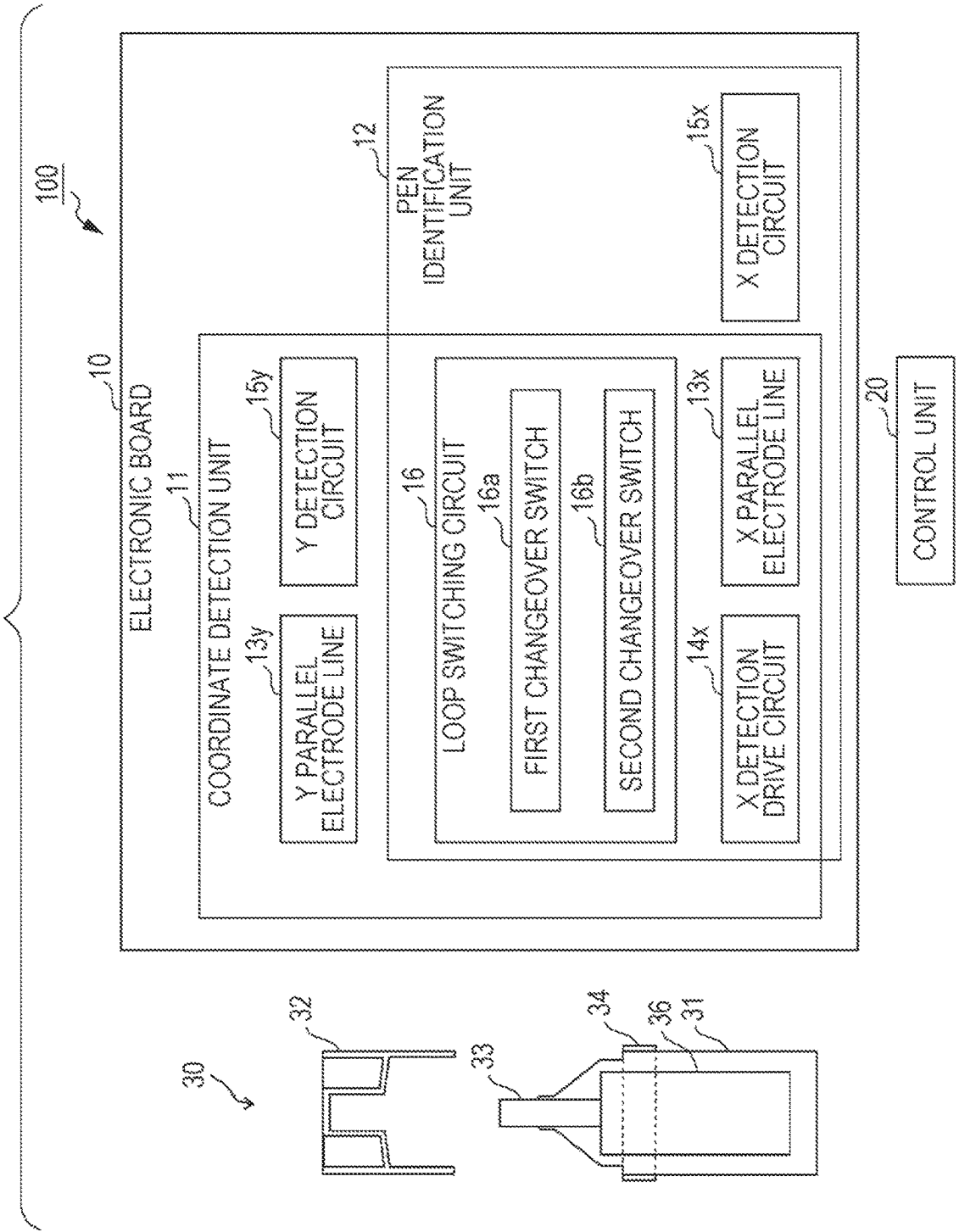
FIG. 1 is an explanatory view illustrating an exemplary configuration of a writing input system according to an embodiment of the present disclosure.
Figure 2:
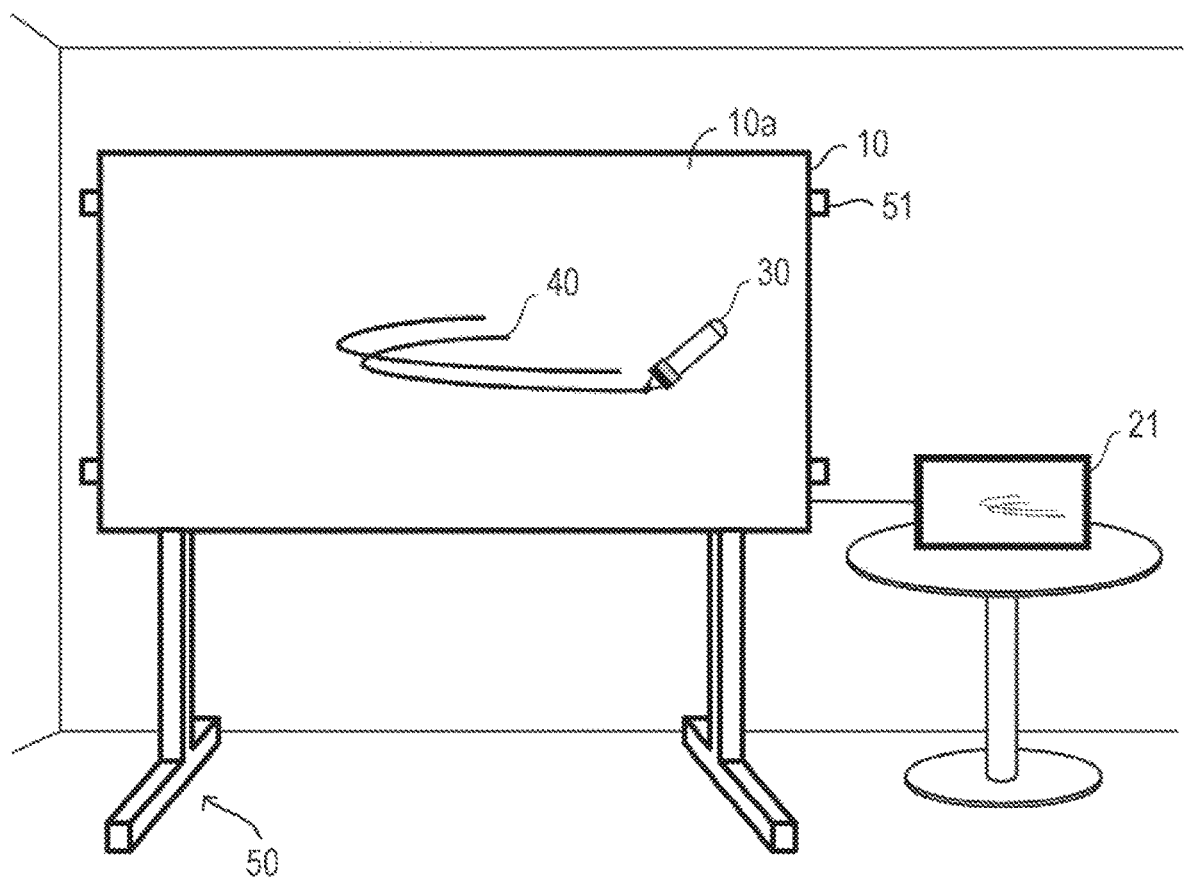
FIG. 2 is an explanatory view illustrating an example of usage of the writing input system according to the embodiment of the present disclosure.
Figure 3:
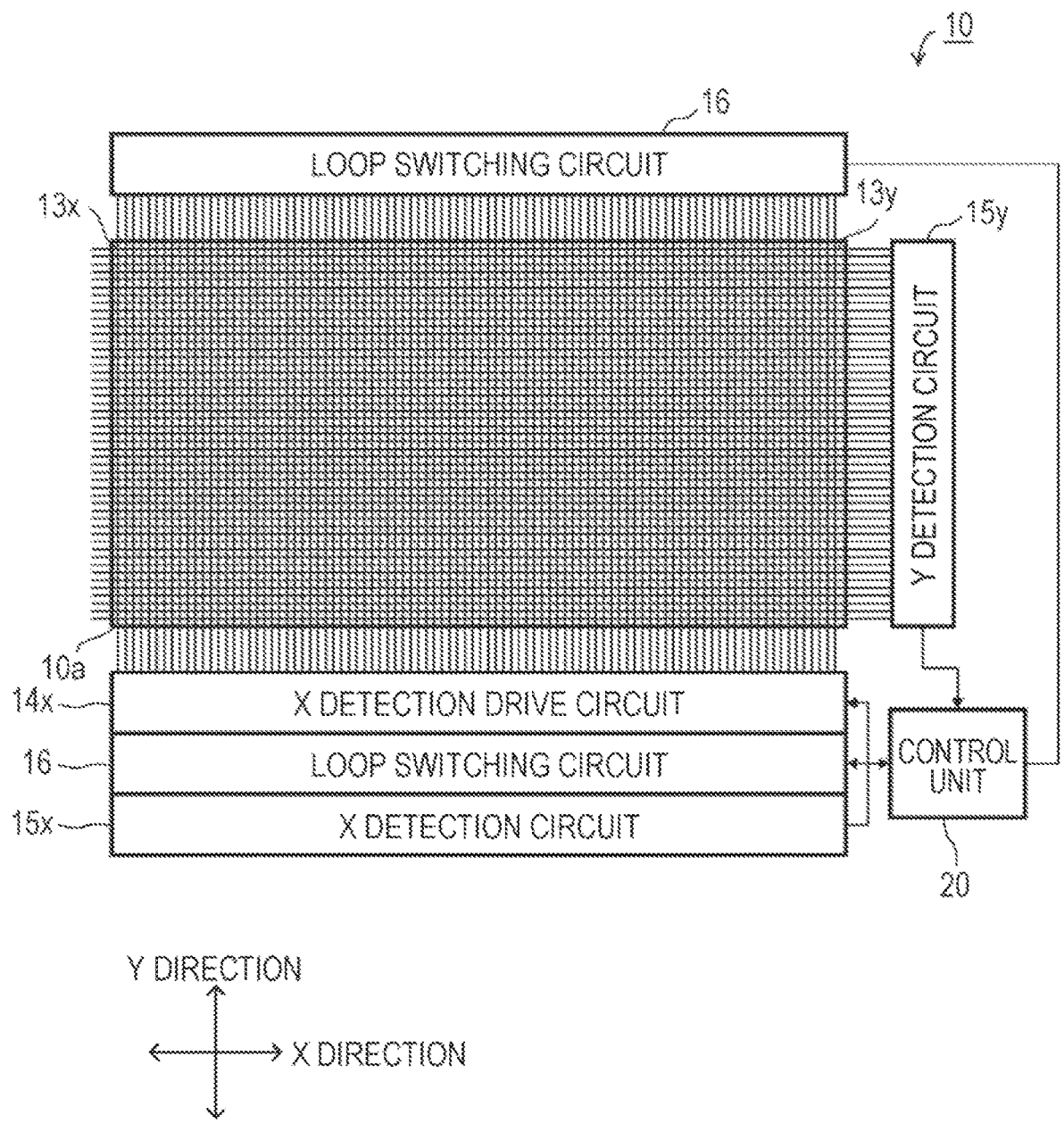
FIG. 3 is an explanatory view illustrating an arrangement of X parallel electrode lines and Y parallel electrode lines in an electronic board according to the embodiment of the present disclosure.
Figure 4:
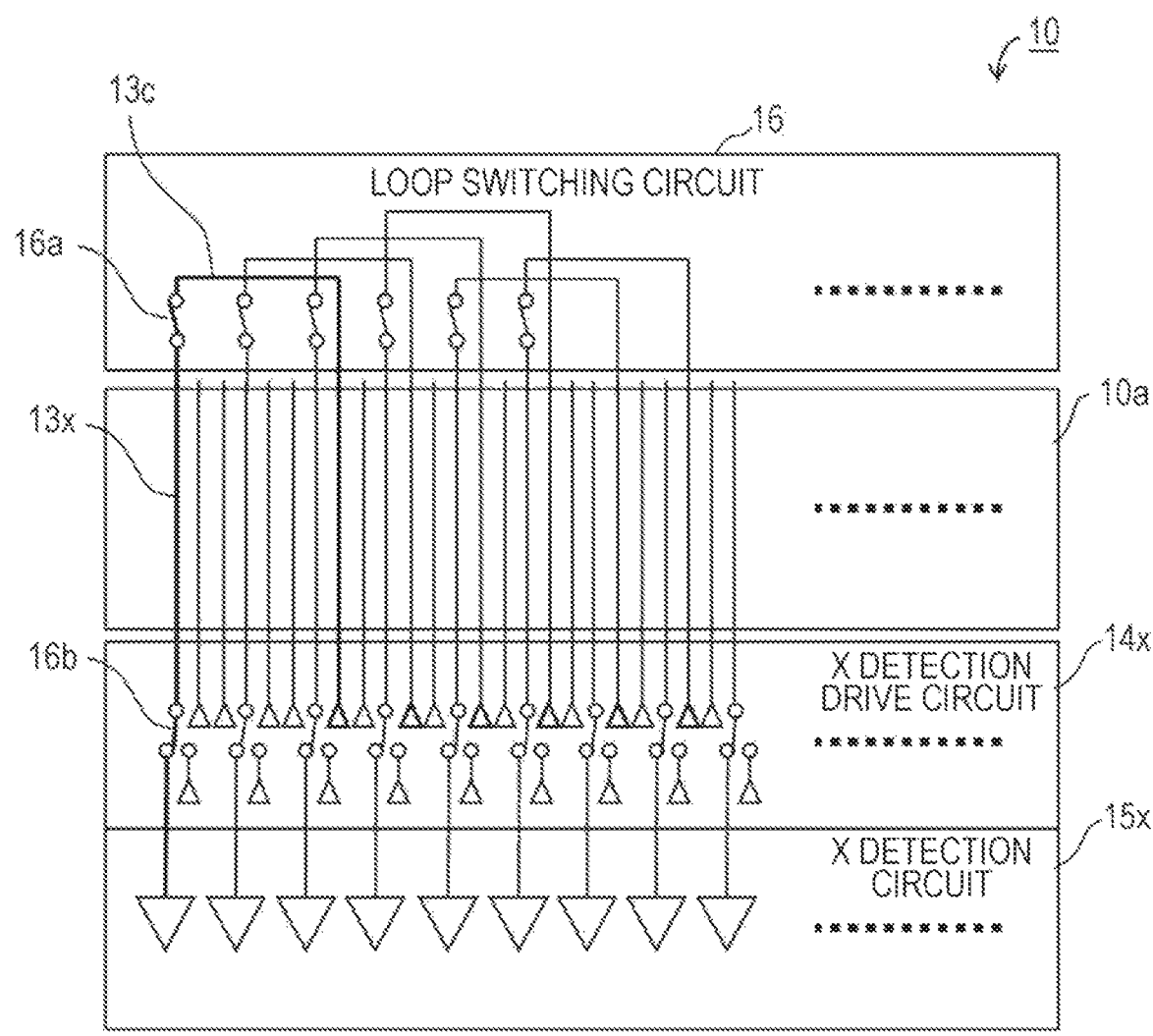
FIG. 4 is an explanatory view referenced to explain the function of a loop switching circuit in the electronic board according to the embodiment of the present disclosure.
Figure 5:
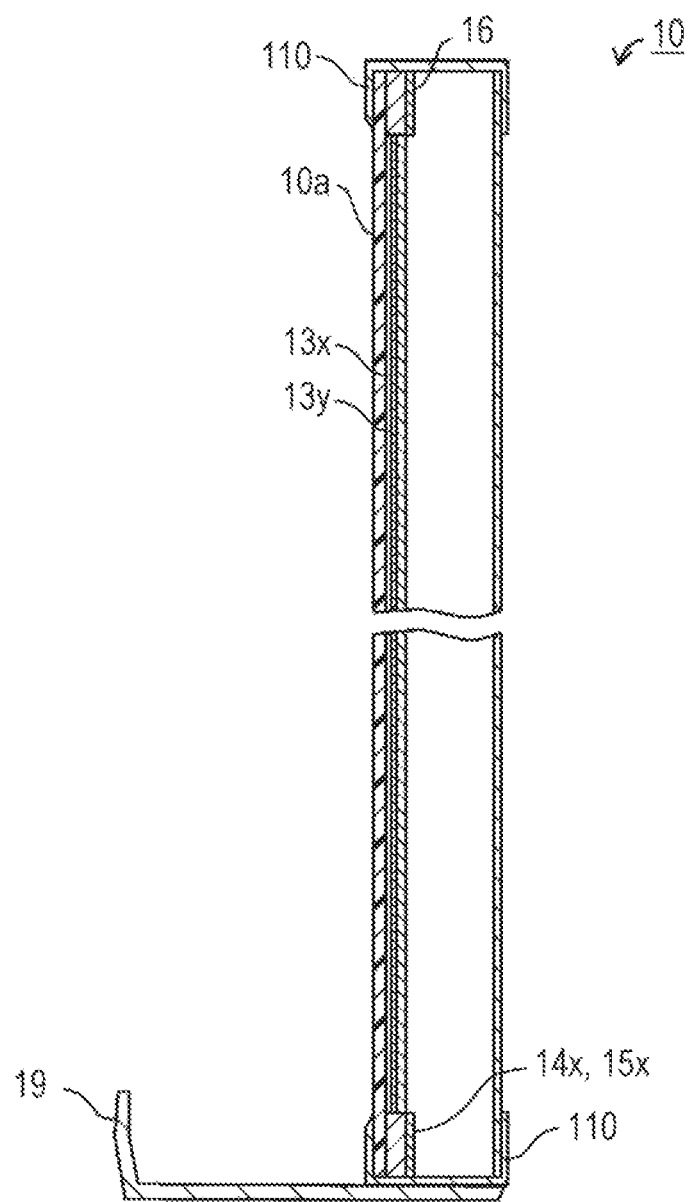
FIG. 5 is a schematic explanatory view illustrating a sectional structure, taken along a vertical direction, of the electronic board according to the embodiment of the present disclosure.

FIG. 1 is an explanatory view illustrating an exemplary configuration of a writing input system 100 according to an embodiment of the present disclosure. FIG. 2 is an explanatory view illustrating an example of usage of the writing input system 110 illustrated in FIG. 1. FIG. 3 is an explanatory view illustrating a configuration, particularly an arrangement of X parallel electrode lines and Y parallel electrode lines, of an electronic board according to the embodiment of the present disclosure. FIG. 4 is an explanatory view referenced to explain the function of a loop switching circuit in the electronic board illustrated in FIG. 1. FIG. 5 is a schematic explanatory view illustrating a sectional basic structure, taken along a vertical direction, of the electronic board illustrated in FIG. 1.

The writing input system 100 illustrated in FIG. 1 includes a pen 30 and an electronic board 10. The pen 30 is a writing instrument including a pen body 31, a cap 32, a pen tip 33, an identifier 34, and an ink supply unit 36. In FIG. 1, the pen 30 is illustrated in such a simplified form as enabling its shape to be easily recognized. The identifier 34 includes an identification circuit not illustrated in FIG. 1. Details of the identifier 34 will be described later.

The cap 32 is detachably attached to the pen body 31. In a state attached to the pen body 31, the cap 32 covers the pen tip 33 such that the pen tip 33 is not exposed to the outside.

The pen tip 33 is formed of, for example, a felt material impregnated with ink. The pen tip 33 can be constituted in the structure of a generally-known marker pen for a white board. When the cap 32 is removed to make the pen tip 33 exposed and a point end of the pen tip 33 is touched to a writing board 10a, i.e., a writing region of the electronic board 10, ink is attached to the touched position, and a visually recognizable handwriting 40 remains on the electronic board 10 (see FIG. 2).

The other end of the pen tip 33 is held in contact with the ink supply unit 36 in which ink is stored. The ink is supplied to the pen tip 33 from the ink supply unit 36 by a capillary phenomenon.

The identifier 34 is attached to an outer periphery of the pen body 31 near a position where the cap 32 is fitted to the pen body 31. The identifier 34 includes the identification circuit not illustrated in FIG. 1. The identification circuit is constituted, for example, by an LC resonance circuit made up of an inductance component L and a capacitor component C.

The writing board 10a is made of a material enabling the handwriting written with the pen 30 to remain thereon. Furthermore, the writing board 10a is made of a material enabling the handwriting to be erased. The writing board 10a may be disposable if it can be inexpensively constituted. However, the writing board 10a is desirably made of a material enabling the handwriting to be erased and enabling writing to be repeated many times. The writing board 10a is made of, for example, a resin material. When the pen 30 is a marker pen, the writing board 10a has a surface similar to that of a marker board.

As illustrated in FIG. 5, the electronic board 10 is surrounded by a bezel 110, which constitutes a frame member, to be given with strength. The surface side of the electronic board 10 surrounded by the bezel 110 provides the writing board 10a, i.e., the writing region. A pen receiving pocket 19 (pen tray) is disposed at a lower end of the electronic board 10. As described later, the pen receiving pocket 19 may be integrally formed with part (later-described lower bezel 110a) of the bezel 110.

As illustrated in FIG. 1, the electronic board 10 includes, looking from a functional point of view, a coordinate detection unit 11 and a pen identification unit 12.

The coordinate detection unit 11 (example of a position detection unit in the present disclosure) detects coordinates of a position on the electronic board 10 (writing board 10a) to which the pen tip 33 of the pen 30 is touched. The pen identification unit 12 detects an identification signal from the identifier 34 attached to the pen 30.

In an exemplary configuration for implementing the above-described function, the coordinate detection unit 11 in this embodiment operates as a capacitive touch panel. Furthermore, the pen identification unit 12 operates as an electromagnetic induction circuit and detects the identification signal from the identifier 34.

The coordinate detection unit 11 includes Y parallel electrode lines 13y, a Y detection circuit 15y, X parallel electrode lines 13x, an X detection drive circuit 14x, and a loop switching circuit 16. The coordinate detection unit 11 shares hardware of the X parallel electrode lines 13x and the X detection drive circuit 14x with the pen identification unit 12. The loop switching circuit 16 is a circuit for switching the shared hardware between the case of using the hardware for the coordinate detection unit 11 and the case of using the hardware for the pen identification unit 12.

The pen identification unit 12 includes the X parallel electrode lines 13x, the X detection drive circuit 14x, and the loop switching circuit 16 which are shared with the coordinate detection unit 11, as well as an X detection circuit 15x.

The X parallel electrode lines 13x (example of first electrode lines in the present disclosure) are a plurality of electrode lines buried near a surface of the electronic board 10 (writing board 10a) on which writing is performed with the pen 30. The X parallel electrode lines 13x are arranged side by side in an X direction (horizontal direction) (example of a second direction in the present disclosure), and they extend in a Y direction (vertical direction) (example of a first direction in the present disclosure) (see FIG. 3).

On the other hand, the Y parallel electrode lines 13y (example of second electrode lines in the present disclosure) are a plurality of electrode lines buried near the surface of the electronic board 10 (writing board 10a) on which writing is performed with the pen 30. The Y parallel electrode lines 13y are arranged side by side in the Y direction (vertical direction), and they extend in the X direction (horizontal direction) (see FIG. 3). Individual lines forming the Y parallel electrode lines 13y and individual lines forming the X parallel electrode lines 13x are buried at different depths (layer). Furthermore, the individual lines forming the Y parallel electrode lines 13y and the individual lines forming the X parallel electrode lines 13x intersect with interposition of an insulating film having a predetermined thickness therebetween, and they are not contacted with each other (see FIG. 5). The X parallel electrode lines 13x and the Y parallel electrode lines 13y are formed of, for example, copper wirings.

Because the X parallel electrode lines 13x and the Y parallel electrode lines 13y are disposed near the surface of the writing board 10a, a material, such as an aluminum plate or a steel plate, electrically or magnetically shielding the X parallel electrode lines 13x and the Y parallel electrode lines 13y is not appropriate for the writing board 10a. For example, a resin material, such as an epoxy resin or a polycarbonate resin having a coating of a melamine resin formed on its surface, is suitably used.

As illustrated in FIG. 3, the X detection drive circuit 14x is connected to the one-end side of the X parallel electrode lines 13x and applies a predetermined voltage to each of the X parallel electrode lines 13x. The predetermined voltage may be different between in the case of functioning as the coordinate detection unit 11 and in the case of functioning as the pen identification unit 12. The X detection drive circuit 14x successively applies an impulse voltage to the X parallel electrode lines 13x from the line at a left end to the line at a right end, for example.

The Y detection circuit 15y detects the magnitude of a voltage or a current induced in each of the Y parallel electrode lines 13y with driving of the X detection drive circuit 14x. The magnitude of the induced voltage or current depends on the magnitude of a coupling capacitance between each X parallel electrode line 13x and each Y parallel electrode line 13y. More specifically, the magnitude of coupling is different between when a dielectric body or a metallic body is in contact with the electronic board 10 near an intersection point of both the electrode lines and when neither a dielectric body nor a metallic body is in contact with the electronic board 10. For instance, because the pen tip 33 impregnated with ink and a human finger are dielectric bodies, the coupling capacitance increases when they are brought into contact with the electronic board 10. The coordinates of a touched position of the pen tip 33 or the human finger onto the electronic board 10 can be detected by detecting change of the coupling capacitance. The above point is known as the operation of the capacitive touch panel.

Because the human finger and the pen tip 33 generally provide different magnitudes of the coupling capacitance, which one of the human finger and the pen tip 33 is touched may be further determined on the basis of difference in the magnitude of the coupling capacitance in addition to detecting the coordinates of the touched position on the electronic board 10.

As illustrated in FIG. 4, the loop switching circuit 16 includes a first changeover switch 16a for switching whether two among the X parallel electrode lines 13x, those two being spaced from each other through a predetermined distance, are to be connected or not on the other-end side. When a pair of the X parallel electrode lines 13x is connected by the first changeover switch 16a on the other-end side, a U-shaped current path is formed. The U-shaped current path functions as an induction coil of the pen identification unit 12. A second changeover switch 16b is disposed on the one-end side of the U-shaped current path.

The second changeover switch 16b operates in sync with the first changeover switch 16a. In a state in which the first changeover switch 16a disconnects the pair of X parallel electrode lines 13x, the second changeover switch 16b connects the X parallel electrode line 13x to the X detection drive circuit 14x. In a state in which the first changeover switch 16a connects the pair of X parallel electrode lines 13x, the second changeover switch 16b connects the X parallel electrode lines 13x to the X detection circuit 15x. Thus, in the disconnected state of the pair of X parallel electrode lines 13x, each X parallel electrode line 13x is driven by the X detection drive circuit 14x.

On the other hand, in the state in which the pair of X parallel electrode lines 13x is connected and the U-shaped current path is formed as an induction coil, the second changeover switch 16b connects the X parallel electrode line 13x on the one-end side of the U-shaped current path to the X detection circuit 15x. A changeover switch is not disposed on the other-end side of the U-shaped current path, and the other-end side is driven by the X detection drive circuit 14x.

In this embodiment, there are plural sets of U-shaped current paths each forming the induction coil, those current paths being arranged side by side in the X direction (horizontal direction).

When the X parallel electrode lines 13x are used for the pen identification unit 12, the loop switching circuit 16 successively drives the induction coils from the coil at left end to the coil at right end one by one. In FIG. 4, an induction coil 13c at the left end is illustrated in a thicker line than the other induction coils to indicate that only the induction coil at the left end is driven. The X detection drive circuit 14x drives the other end of the induction coil 13c that constitutes the U-shaped current path, while changing a drive frequency. The magnitude of a current flowing through the induction coil depending on the frequency is detected by the X detection circuit 15x on the one-end side of the induction coil 13c. Subsequently, similar detection is performed on another induction coil on the right next to the preceding induction coil. Thus, the similar detection is performed while movement to still another induction coil on the right is successively repeated.

The loop switching circuit 16 is a component enabling the coordinate detection unit 11 and the pen identification unit 12 to share the X parallel electrode lines 13x.

When the identifier 34 is present near the driven induction coil and when the induction coil is driven at a drive frequency corresponding to the resonant frequency of the identifier, a large resonance current flows in a resonance circuit through electromagnetic coupling to the induction coil. Therefore, a large current also flows on the induction coil side. In which region in the X direction the identifier 34 resonating at which resonance frequency is present can be detected by detecting the magnitude of the current by the X detection circuit 15x.

In this embodiment, the resonance frequency of the identifier 34 is predetermined corresponding to the attribute of the pen 30.

FIGS. 6A and 6B are each an explanatory view illustrating an example of definition representing correspondence between resonance frequencies f0 and attributes of the pen 30 in this embodiment. A list illustrated in FIG. 6A represents an example in which ink colors (writing colors) of the pen are set corresponding to the resonance frequencies f0 of the identifier 34. The different resonance frequencies f0 are defined corresponding to various colors, i.e., black, blue, green, yellow, orange, and red. In accordance with the writing color of each pen, a user attaches the identifier 34 having the corresponding resonance frequency f0 to that pen.

A list illustrated in FIG. 6B represents an example in which various combinations of the writing colors of the pen 30 and attributes of the pen tip, i.e., thickness and shape of the pen tip, are set corresponding to the resonance frequencies f0. By assigning the resonance frequencies f0 uniquely corresponding to the combinations of plural items of the attributes in a one-to-one relation as illustrated in FIG. 6B, it is possible to obtain the plural items of the attributes corresponding to the detected resonance frequency f0. The resonance frequencies f0 are not limited to values listed in FIGS. 6A and 6B, and are selected on the basis of the size and balance of oscillation energy (intensity) of a resonance coil of the identifier 34. The resonance frequencies f0 may be defined in the range of about 400 to 700 kHz, for example.

When the coordinate detection unit 11 detects the position coordinates of the pen tip 33 in the region where the pen identification unit 12 has detected the presence of the identifier 34, handwriting data depending on both the position coordinates and the pen attribute corresponding to the identification information can be produced.

The handwriting data may be produced on the basis of the results detected by the coordinate detection unit 11 and the pen identification unit 12 by causing a personal computer to execute a dedicated processing program, for example. Alternatively, a microcomputer may be incorporated in the electronic board 10 and may be operated to execute not only processing in the coordinate detection unit 11 or the pen identification unit 12, but also processing to produce the handwriting data.

In FIG. 1, a unit of executing the processing to produce the handwriting data is denoted by a control unit 20. The control unit 20 is constituted by a CPU or a microcomputer as a central unit, peripheral circuits such as a timer and an input/output circuit, a memory, etc.

The control unit 20 may be separate from the electronic board 10 or integral with the electronic board 10, namely incorporated in the electronic board 10. In other words, the control unit 20 may execute the processing outside the writing input system 100 according to this embodiment, or may be included in the writing input system 100. In the former case, the writing input system 100 detects and provides information that is the basis for producing the handwriting data. In the latter case, the writing input system 100 executes operation including the production of the handwriting data in addition to the above-described processing.

When the writing input system 100 according to the embodiment of the present disclosure executes the operation including the production of the handwriting data, a display unit 21 may be connected to the control unit 20 as illustrated in FIG. 2, for example, such that the produced handwriting data can be displayed in real time. Of course, also in the case of not displaying the handwriting data on the display unit 21, the handwriting 40 written with the pen 30 remains on the writing board 10a of the electronic board 10.

The display unit 21 is effective in confirming that the handwriting data produced by the control unit 20 is matched with the handwriting 40 on the writing board 10a.

The attribute of the pen 30 is reflected on the handwriting data. According to the definition illustrated in FIG. 6A, for example, a writing color of the handwriting data displayed on the display unit 21 is matched with a writing color of the handwriting 40. According to the definition illustrated in FIG. 6B, in the displayed handwriting data, the thickness and shape of the handwriting further reflect the thickness and shape of the pen tip 33. When a hard copy of the handwriting data is printed using a not-illustrated color printer, the hard copy reflecting not only the writing color, but also the thickness and shape of the pen tip can be obtained.

Structure of Electronic Board

A detailed structure of the electronic board 10 according to the embodiment of the present disclosure will be described below. The electronic board 10 is used in a state mounted to, for example, a stand 50 as illustrated in FIG. 2, or mounted to a wall surface. Alternatively, the electronic board 10 may be removably mounted in a state hanged on, for example, a frame 51 of the stand 50.

Figure 8:
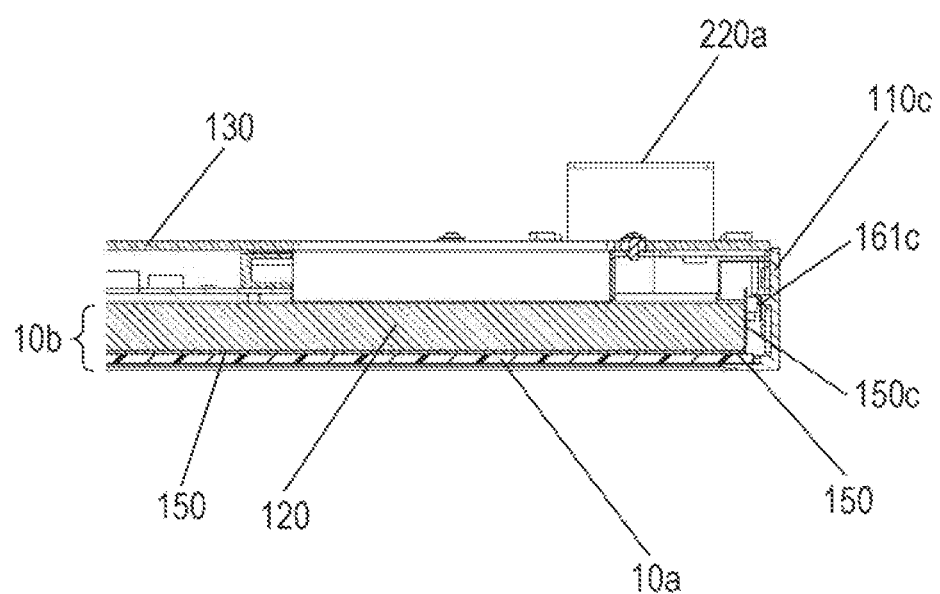
FIG. 8 illustrates part (right end region) of a section taken along a line VIII,XII-VIII,XII in FIG. 7.
Figure 10:
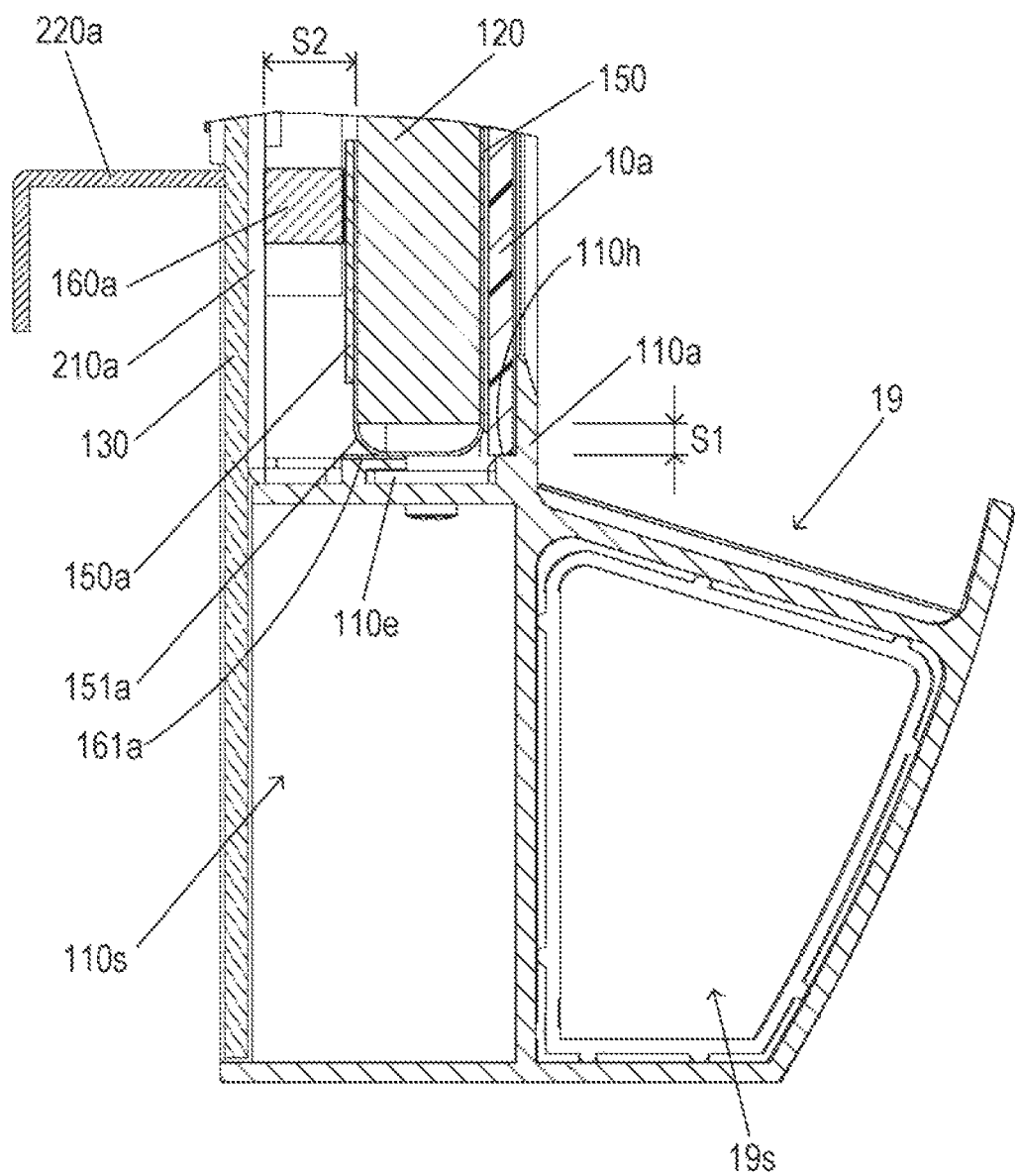
FIG. 10 illustrates part (lower end region) of the section taken along the line IX,X,XI-IX,X,XI in FIG. 7.
Figure 11:
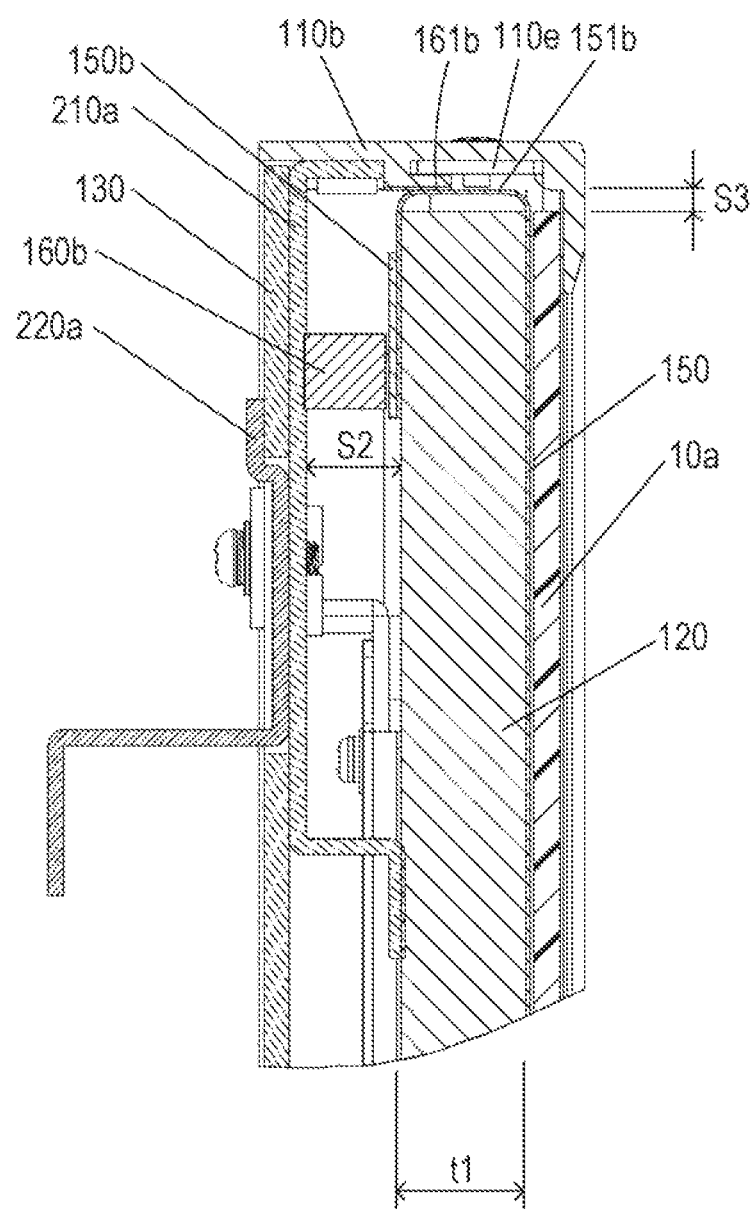
FIG. 11 illustrates part (upper end region) of the section taken along the line IX,X,XI-IX,X,XI in FIG. 7.
Figure 12:
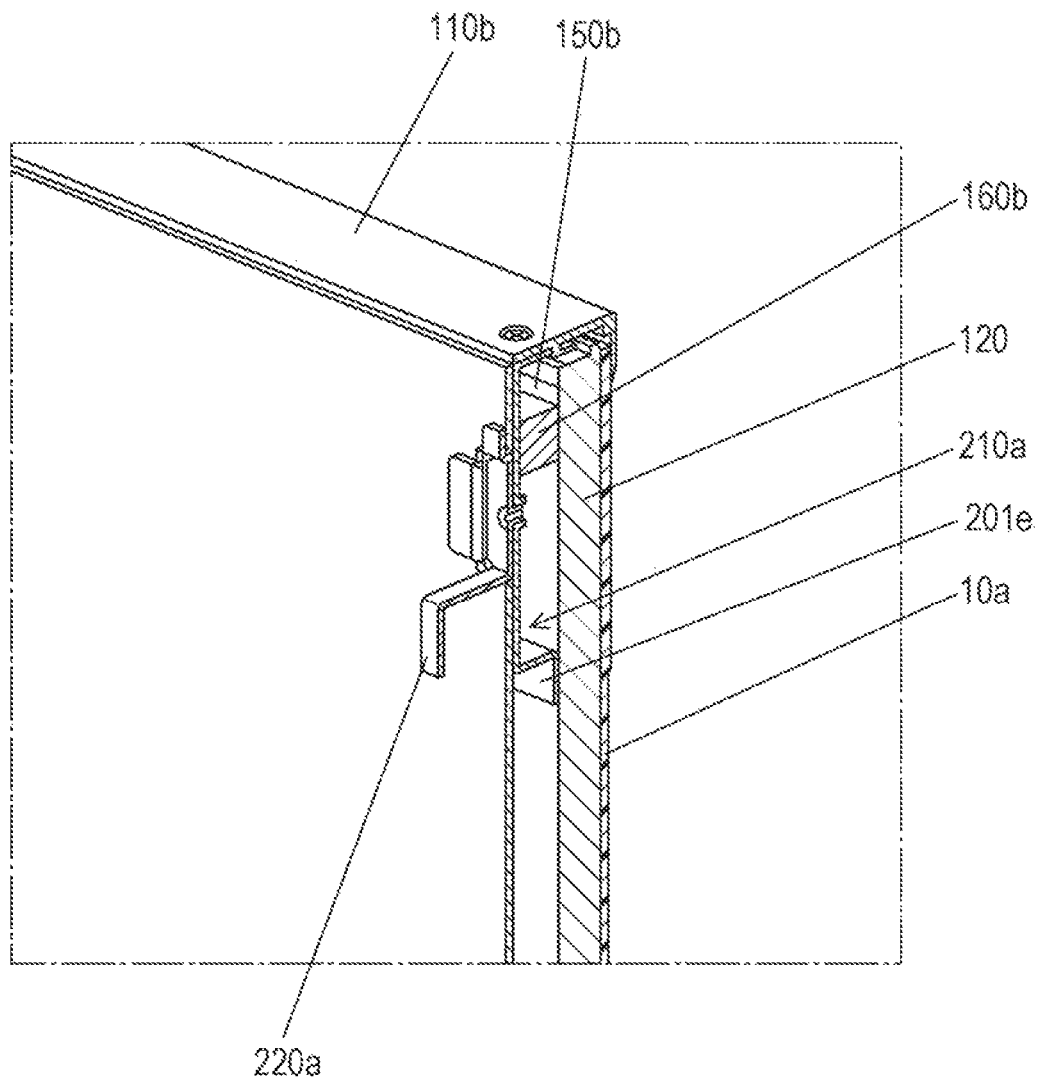
FIG. 12 is a perspective view illustrating part (upper end region) of the section taken along the line VIII,XII-VIII,XII in FIG. 7.
Figure 13:
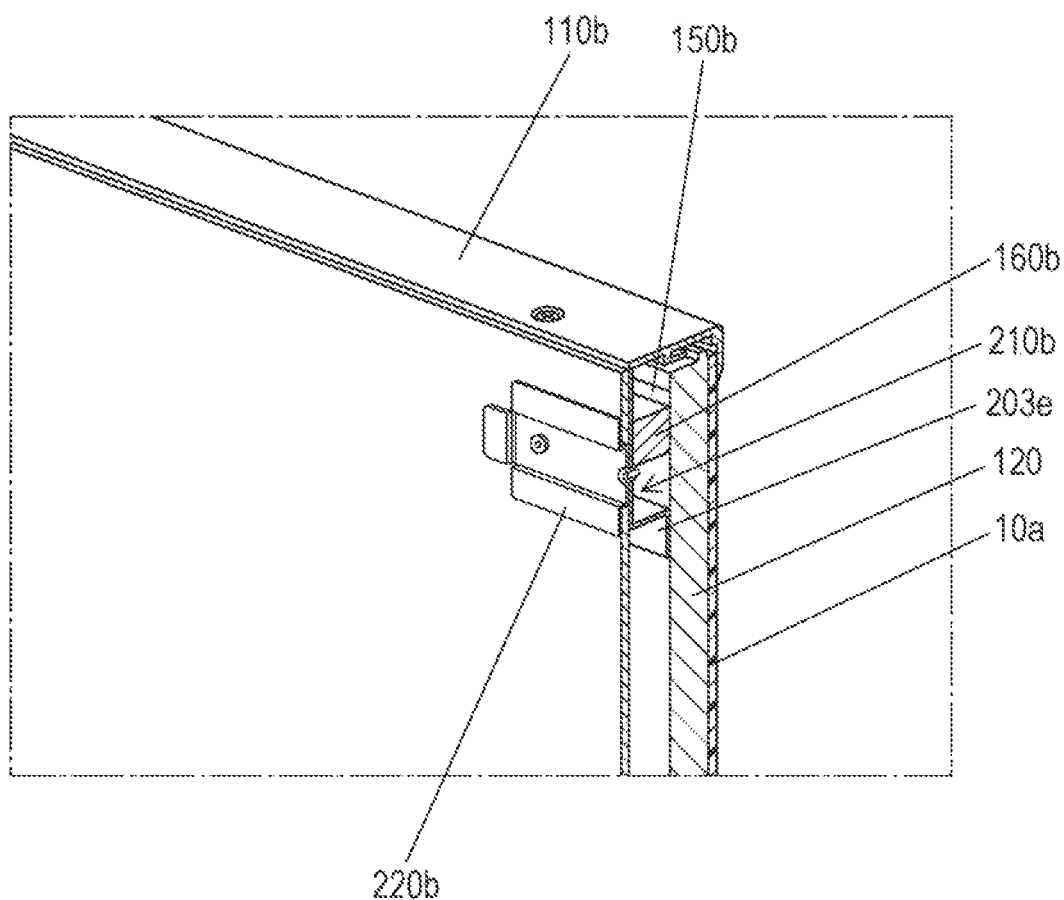
FIG. 13 is a perspective view illustrating part (upper end region) of a section taken along a line XIII-XIII in FIG. 7.

FIG. 7 is a rear view looking, from the rear side, the electronic board 10 according to the embodiment. FIG. 8 illustrates part (right end region) of a section taken along a line VIII,XII-VIII,XII in FIG. 7. FIG. 9 illustrates parts (upper end region and lower end region) of a section taken along a line IX,X,XI-IX,X,XI in FIG. 7. FIG. 10 illustrates part (lower end region) of the section taken along the line IX,X,XI-IX,X,XI in FIG. 7. FIG. 11 illustrates part (upper end region) of the section taken along the line IX,X,XI-IX, X,XI in FIG. 7. FIG. 12 is a perspective view illustrating part (upper end region) of the section taken along the line VIII,XII-VIII,XII in FIG. 7. FIG. 13 is a perspective view illustrating part (upper end region) of a section taken along a line XIII-XIII in FIG. 7.

The electronic board 10 includes the writing board 10a made of a resin material on which the handwriting 40 written with the pen 30 remains, a sensor sheet 150 disposed on the rear side of the writing board 10a, a chassis 120 disposed on the rear side of the sensor sheet 150 that is bonded to the chassis 120, a rear cover 130 disposed on the rear side of the chassis 120 and covering a rear surface of the electronic board 10, and the bezel 110 surrounding the electronic board 10 and constituting an outer frame.

The writing board 10a, the sensor sheet 150, and the chassis 120 are bonded together and formed into an integral unit by using a double-sided tape, an adhesive, or the like (example of an adhesive material in the present disclosure).

The integral unit of the writing board 10a, the sensor sheet 150, and the chassis 120 constitutes a sensor unit 10b (see FIG. 8, etc.). The writing board 10a, the sensor sheet 150, and the chassis 120 are just to be fixed together and formed into the integral unit. In another example, they may be integrally fixed at peripheral lateral surfaces by using an adhesive or the like, or may be integrally fixed by using one or more other members (such as screws or a frame).

Figure 14:
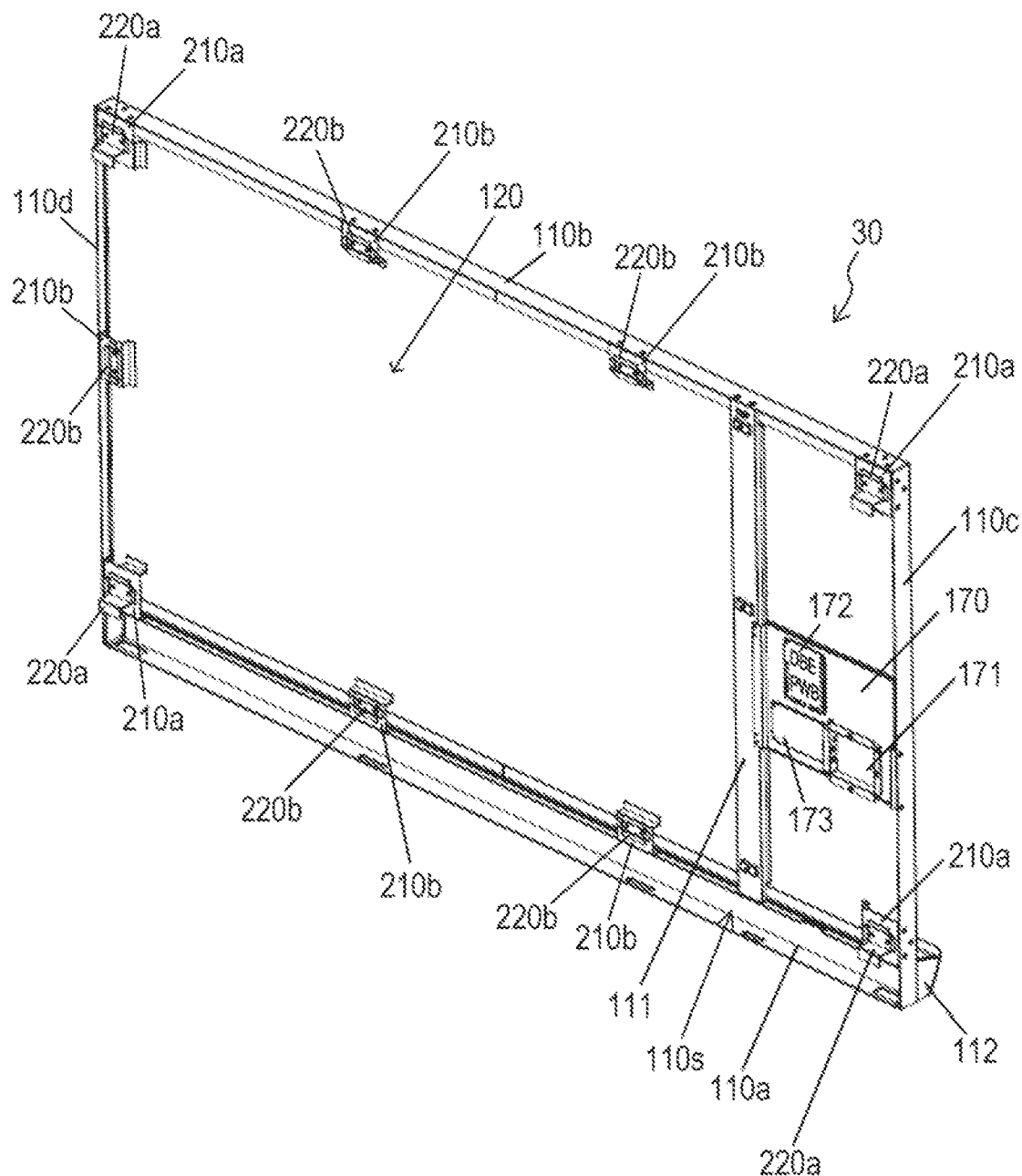
FIG. 14 is a perspective view when looking, from the rear side, the electronic board according to the embodiment of the present disclosure.

As illustrated in FIG. 14 described later, the bezel 110 is constituted in the form of a frame by coupling a lower bezel 110a, an upper bezel 110b, a right bezel 110c, and a left bezel 110d to each other. The lower bezel 110a or the upper bezel 110b is an example of a first bezel in the present disclosure, and the right bezel 110c or the left bezel 110d is an example of a second bezel in the present disclosure. The sensor unit 10b is disposed within the frame of the bezel 110, and metal fittings (later-described corner reinforcement plates 210a and chassis fixing plates 210b) for supporting the sensor unit 10b from the rear side are attached to a rear surface of the sensor unit 10b, and the rear cover 130 is attached to the metal fittings.

As illustrated in FIG. 9, the pen receiving pocket 19 and spaces 110s and 19s storing various wirings, etc. are integrally formed with the lower bezel 110a.

The sensor sheet 150 is constituted by fixedly bonding a transparent film on which the X parallel electrode lines 13x are arrayed, a transparent film on which the Y parallel electrode lines 13y are arrayed, and an insulating film disposed between those electrode lines together by using double-sided tapes, for example. The sensor sheet 150 is in the form of a film as a whole and has flexibility. A sensor board 150a (example of a first sensor board in the present disclosure) is connected to a lower end of the sensor sheet 150, a sensor board 150b is connected to an upper end of the sensor sheet 150, and a sensor board 150c (example of a second sensor board in the present disclosure) is connected to a right end (or left end) of the sensor sheet 150. One ends (lower ends) of the X parallel electrode line 13x are connected to the sensor board 150a, the other ends (upper ends) of the X parallel electrode line 13x are connected to the sensor board 150b, and one ends (right ends) of the Y parallel electrode line 13y are connected to the sensor board 150c.

Sensor wirings (sensor wirings 152x and 152y in FIGS. 28 and 29) are disposed on the sensor board 150a, and one ends of the sensor wirings are electrically connected to the one ends of the X parallel electrode lines 13x, respectively. The other ends of the sensor wirings are electrically connected to connector connection portions (connector connection portions 156 in FIGS. 28 and 29) incorporated in the sensor board 150a. Relay wirings (not illustrated) are connected to the connector connection portions, and those relay wirings are electrically connected to the X detection drive circuit 14x and the X detection circuit 15x.

Sensor wirings are disposed on the sensor board 150b, and one ends of the sensor wirings are electrically connected to the other ends of the X parallel electrode lines 13x, respectively. The other ends of the sensor wirings are electrically connected to connector connection portions incorporated in the sensor board 150b. Relay wirings are connected to the connector connection portions, and those relay wirings are electrically connected to the loop switching circuit 16.

Sensor wirings are disposed on the sensor board 150c, and one ends of the sensor wirings are electrically connected to the Y parallel electrode lines 13y, respectively. The other ends of the sensor wirings are electrically connected to connector connection portions incorporated in the sensor board 150c. Relay wirings are connected to the connector connection portions, and those relay wirings are electrically connected to the Y detection circuit 15y. The above-mentioned relay wirings are connected to a controller board 172 (see FIG. 14) disposed on the rear side of the chassis 120. Detailed structures of the sensor boards 150a, 150b and 150c are described later.

Instead of the above-described arrangement, the sensor board 150a may be connected to the right end of the sensor sheet 150, the sensor board 150b may be connected to the left end of the sensor sheet 150, and the sensor board 150c may be connected to the upper end (or the lower end) of the sensor sheet 150.

FIG. 14 is a perspective view when looking the electronic board 10 from the rear side. In FIG. 14, the rear cover 130 is omitted. A reinforcement plate 111 is vertically disposed on a rear surface of the chassis 120. The reinforcement plate 111 is fixedly screwed at a lower end to the lower bezel 110a and is fixedly screwed at an upper end to the upper bezel 110b. A central portion of the reinforcement plate 111 is held in contact with the rear surface of the chassis 120. A circuit board tray 170 is disposed between the reinforcement plate 111 and the right bezel 110c. An interface connection plate 171, the controller board 172, and an interface board 173 are mounted to the circuit board tray 170. The control unit 20, the X detection drive circuit 14x, the X detection circuit 15x, the loop switching circuit 16, the Y detection circuit 15y, and so on are mounted to the controller board 172. A cable (wiring) connected to an external unit such as a personal computer (PC) or a projector, for example, is connected to the interface board 173. In the writing input system 100, when an image output from a projector, for example, is projected onto the writing board 10a and the user writes information, such as handwritten characters, on the writing board 10a while referring to the projected image, the projected image after being added with the handwritten information (handwriting data) can be overwritten and saved. A data file, etc. produced in the electronic board 10 can be stored in a storage medium such as a USB (registered trademark).

The rear surface of the chassis 120 is supported by the corner reinforcement plates 210a disposed in corner portions (four corners), and by the chassis fixing plates 210b disposed in portions other than the corner portions. The corner reinforcement plates 210a and the chassis fixing plates 210b are examples of support members in the present disclosure. Four corner reinforcement plates 210a and five chassis fixing plates 210b are illustrated in FIG. 14. The number of the chassis fixing plates 210b is not limited. The corner reinforcement plates 210a are each fixedly screwed to two adjacent members (sides) of the bezel 110 in each corner portion, and the chassis fixing plates 210b are each fixedly screwed to one member (side) of the bezel 110.

Figure 15:
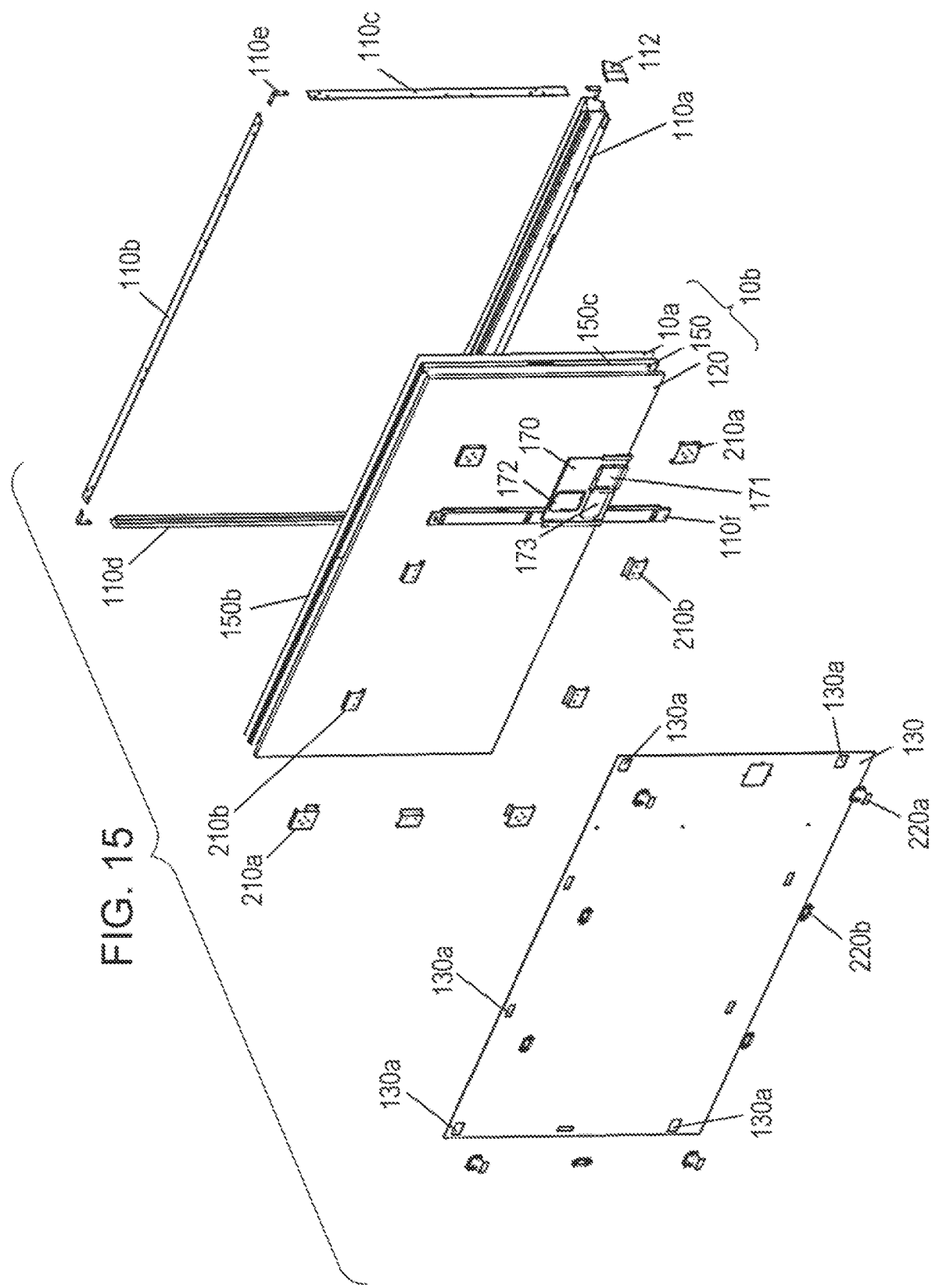
FIG. 15 is an exploded perspective view when looking, from the rear side, the electronic board according to the embodiment of the present disclosure.

FIG. 15 is an exploded perspective view when looking, from the rear side, the electronic board 10. The lower bezel 110a, the upper bezel 110b, the right bezel 110c, and the left bezel 110d are coupled to each other by corner coupling plates 110e (L-shaped metal fittings) disposed at the corner portions (four corners), whereby the frame-shaped bezel 110 is formed. The frame-shaped bezel 110 may be integrally molded using, for example, a metal material or a resin material.

A board mounting plate 220a (example of an attachment member in the present disclosure) is fixedly screwed to a rear surface of each corner reinforcement plate 210a, and a rear cover retaining plate 220b is fixedly screwed to a rear surface of each chassis fixing plate 210b. Openings 130a are formed in the rear cover 130 in portions overlapping with the corner reinforcement plates 210a and the chassis fixing plates 210b. The board mounting plate 220a is inserted through the opening 130a from the rear side of the rear cover 130 and is fixedly screwed to the corner reinforcement plate 210a. The rear cover retaining plate 220b is inserted through the opening 130a from the rear side of the rear cover 130 and is fixedly screwed to the chassis fixing plate 210b. The rear cover 130 is fixed (clamped) in a state sandwiched between the corner reinforcement plates 210a and the board mounting plates 220a and between the chassis fixing plates 210b and the rear cover retaining plates 220b.

Figure 16:
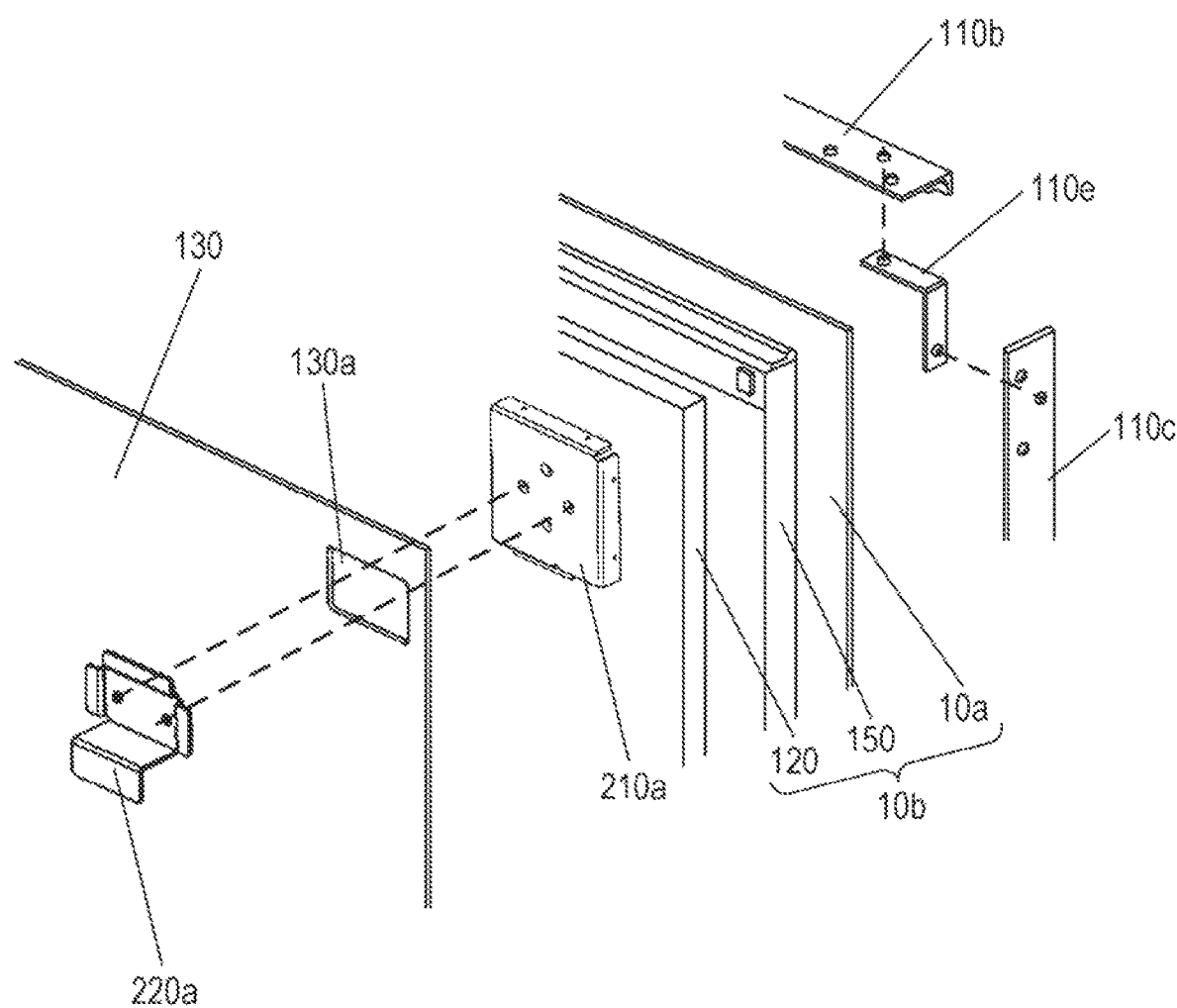
FIG. 16 is an exploded perspective view illustrating a manner of fixing the electronic board in an upper corner portion of the electronic board according to the embodiment of the present disclosure.

FIG. 16 is an exploded perspective view illustrating a manner of fixing the electronic board 10 in the corner portion. The upper bezel 110b and the right bezel 110c are coupled to each other with the aid of the corner coupling plate 110e by using screws, for example. The writing board 10a, the sensor sheet 150, and the chassis 120 are successively arranged in the mentioned order and are formed into the integral unit by bonding those members together with an adhesive material (e.g., a both-sided tape) interposed between adjacent two of those members. The integral sensor unit 10b is inserted into the inner side of the frame-shaped bezel 110.

Figure 17:
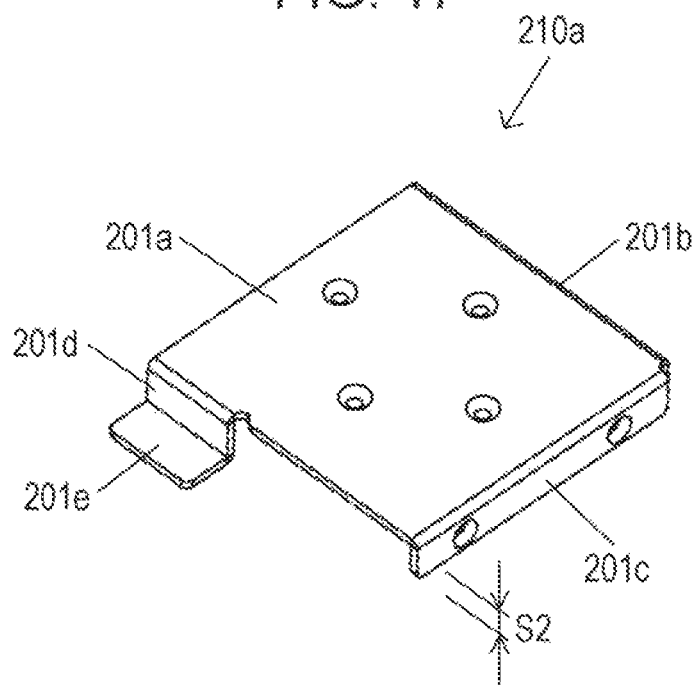
FIG. 17 is a perspective view illustrating a structure of a corner reinforcement plate in the electronic board according to the embodiment of the present disclosure.

As illustrated in FIG. 16, the corner reinforcement plate 210a is fixedly screwed to the upper bezel 110b and the right bezel 110c while pressing the rear surface of the chassis 120 of the sensor unit 10b. FIG. 17 is a perspective view illustrating a structure of the corner reinforcement plate 210a. As illustrated in FIG. 17, the corner reinforcement plate 210a includes a top surface portion 201a, a first lateral surface portion 201b (example of a first lateral surface portion in the present disclosure), a second lateral surface portion 201c (example of a second lateral surface portion in the present disclosure), a third lateral surface portion 201d, and a chassis retaining portion 201e (corresponding to a chassis retaining portion in the present disclosure). The top surface portion 201a is a portion to be positioned parallel to the rear surface of the chassis 120 and has four screw holes for screw-fixing to the board mounting plate 220a. The first lateral surface portion 201b extends from an edge of the top surface portion 201a toward the rear surface of the chassis 120 and has two screw holes for screw-fixing to the upper bezel 110b (see FIG. 16). The second lateral surface portion 201c extends from an edge of the top surface portion 201a toward the rear surface of the chassis 120 and has two screw holes for screw-fixing to the right bezel 110c (see FIG. 16). The third lateral surface portion 201d extends from an edge of the top surface portion 201a toward the rear surface of the chassis 120, and the chassis retaining portion 201e extends from an edge of the third lateral surface portion 201d in a direction parallel to the rear surface of the chassis 120. A space S2 is formed in a portion surrounded by the top surface portion 201a, the first lateral surface portion 201b, the second lateral surface portion 201c, and the third lateral surface portion 201d. When the first lateral surface portion 201b and the second lateral surface portion 201c of the corner reinforcement plate 210a are fixedly screwed to the upper bezel 110b and the right bezel 110c, respectively, the chassis retaining portion 201e is held in contact with the rear surface of the chassis 120 and supports the sensor unit 10b from the rear side. Furthermore, a gap corresponding to the space S2 is formed between the top surface portion 201a of the corner reinforcement plate 210a and the chassis 120 (see FIG. 11).

Figure 18:
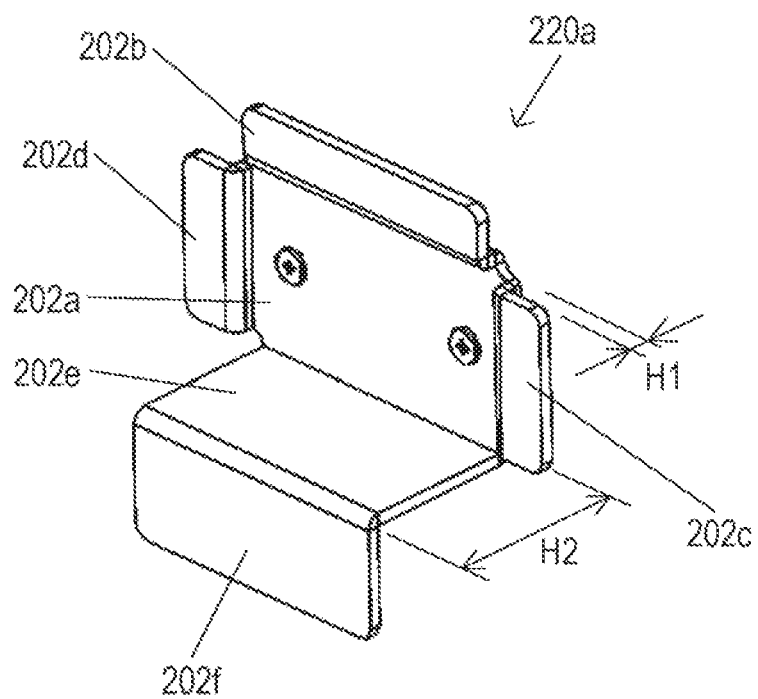
FIG. 18 is a perspective view illustrating a structure of a board mounting plate in the electronic board according to the embodiment of the present disclosure.

As illustrated in FIG. 16, the board mounting plate 220a is inserted through the opening 130a from the rear side of the rear cover 130 and is fixedly screwed to the corner reinforcement plate 210a. FIG. 18 is a perspective view illustrating a structure of the board mounting plate 220a. As illustrated in FIG. 18, the board mounting plate 220a includes a bottom surface portion 202a, a first rear cover retaining portion 202b, a second rear cover retaining portion 202c, a third rear cover retaining portion 202d, a hanging portion 202e, and a hooking portion 202f. The bottom surface portion 202a is a portion to be positioned parallel to the rear surface of the chassis 120 and has two screw holes for screw-fixing to the corner reinforcement plate 210a. Each of the first rear cover retaining portion 202b, the second rear cover retaining portion 202c, and the third rear cover retaining portion 202d extends from an edge of the bottom surface portion 202a toward the rear side of the electronic board 10 by a height H1 and further extends in the direction parallel to the rear surface of the chassis 120. Each of the first rear cover retaining portion 202b, the second rear cover retaining portion 202c, and the third rear cover retaining portion 202d is an example of a rear cover retaining portion in the present disclosure.

The hanging portion 202e extends from a lower edge of the bottom surface portion 202a toward the rear side of the electronic board 10 by a height H2, and the hooking portion 202f extends from an edge of the hanging portion 202e in the direction (downward) parallel to the rear surface of the chassis 120. The height H1 is set substantially equal to a thickness of the rear cover 130. When the board mounting plate 220a is inserted through the opening 130a of the rear cover 130 and the bottom surface portion 202a of the board mounting plate 220a is fixedly screwed to the top surface portion 201a of the corner reinforcement plate 210a, the first rear cover retaining portion 202b, the second rear cover retaining portion 202c, and the third rear cover retaining portion 202d are held in contact with a rear surface of the rear cover 130 and support the rear cover 130 from the rear side. The hanging portion 202e and the hooking portion 202f are hung on the frame 51 (see FIG. 2). The hanging portion 202e may be disposed at an upper edge of the bottom surface portion 202a or at an upper edge of the first rear cover retaining portion 202b. From the viewpoint of simplification in structure and manufacturing, the hanging portion 202b is desirably disposed at the lower edge of the bottom surface portion 202a.

Figure 19A:
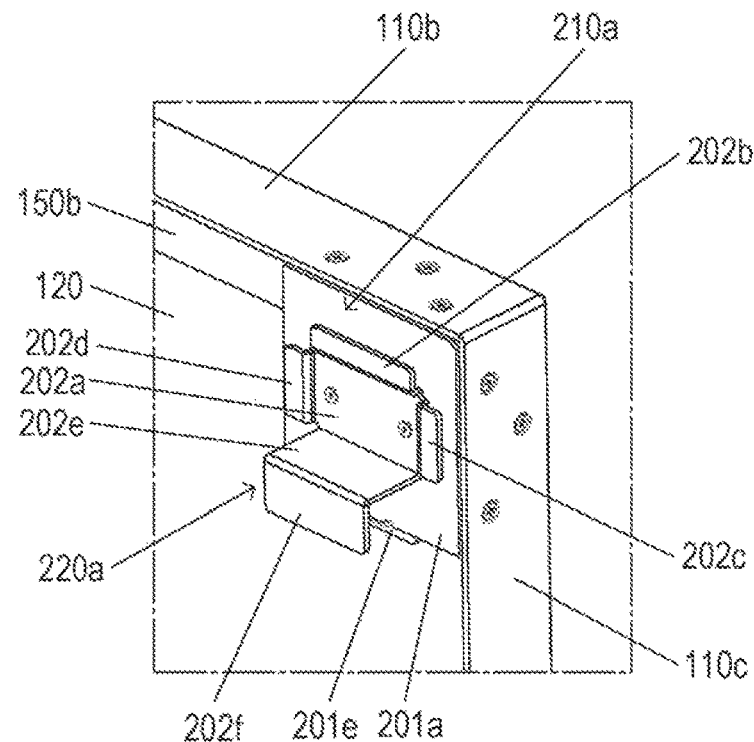
FIG. 19A is a perspective view illustrating a state in which the corner reinforcement plate and the board mounting plate are fixedly screwed to each other in an upper right corner portion of the electronic board according to the embodiment of the present disclosure.

FIG. 19A is a perspective view illustrating a state in which the corner reinforcement plate 210a and the board mounting plate 220a are fixedly screwed to each other in an upper right corner portion of the electronic board 10. In FIG. 19A, the rear cover 130 is omitted. The corner reinforcement plate 210a is fixedly screwed to the upper bezel 110b and the right bezel 110c, and the chassis retaining portion 201e supports the chassis 120 while pressing the chassis 120 from the rear side. The bottom surface portion 202a of the board mounting plate 220a is fixedly screwed to the top surface portion 201a of the corner reinforcement plate 210a, while the first rear cover retaining portion 202b, the second rear cover retaining portion 202c, and the third rear cover retaining portion 202d of the board mounting plate 220a support the rear cover 130 (see FIG. 15) from the rear side.

Figure 19B:
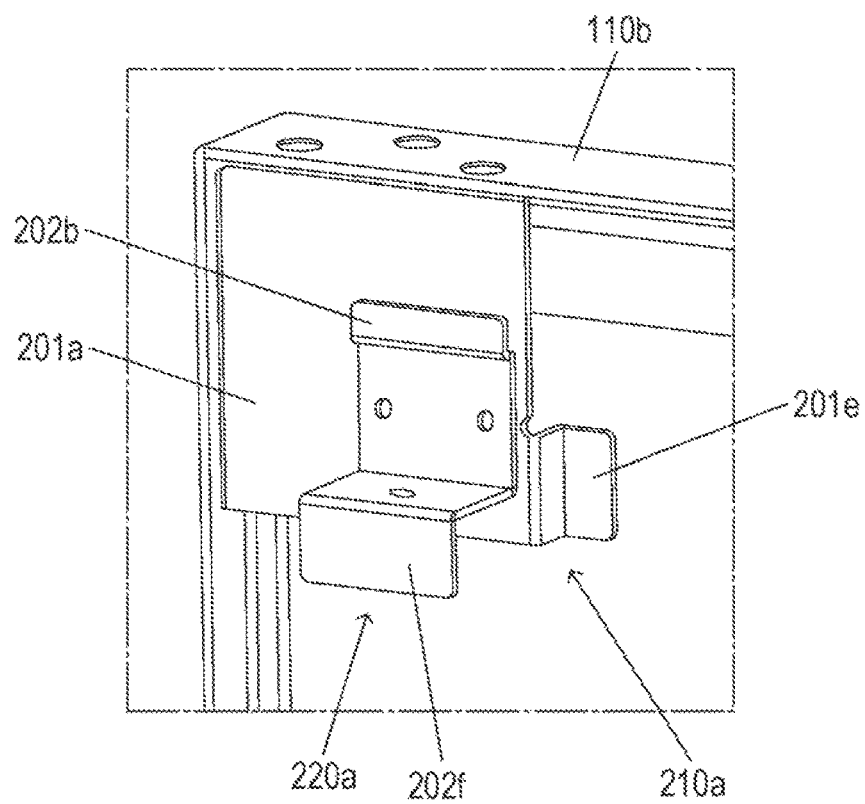
FIG. 19B is a perspective view illustrating a state in which the corner reinforcement plate and the board mounting plate are fixedly screwed to each other in an upper left corner portion of the electronic board according to the embodiment of the present disclosure.

As illustrated in FIG. 19B, the board mounting plate 220a may have a structure in which the second rear cover retaining portion 202c and the third rear cover retaining portion 202d are omitted. FIG. 19B is a perspective view illustrating a state in which the corner reinforcement plate 210a and the board mounting plate 220a are fixedly screwed to each other in an upper left corner portion of the electronic board 10. The bottom surface portion 202a of the board mounting plate 220a is fixedly screwed to the top surface portion 201a of the corner reinforcement plate 210a, while the first rear cover retaining portion 202b of the board mounting plate 220a supports the rear cover 130 (see FIG. 15) from the rear side.

Figure 19C:
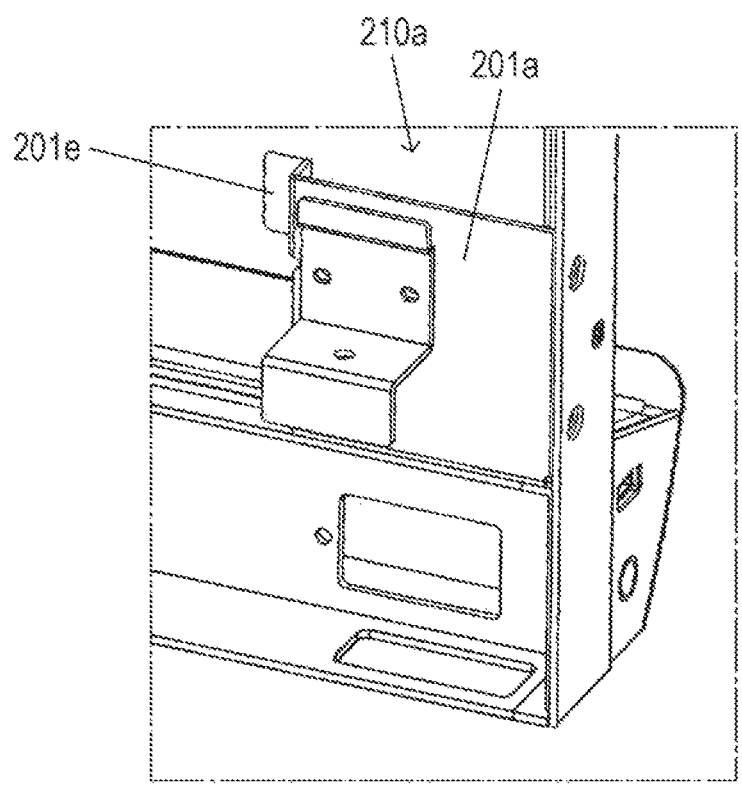
FIG. 19C is a perspective view illustrating a state in which the corner reinforcement plate and the board mounting plate are fixedly screwed to each other in a lower right corner portion of the electronic board according to the embodiment of the present disclosure.
Figure 19D:
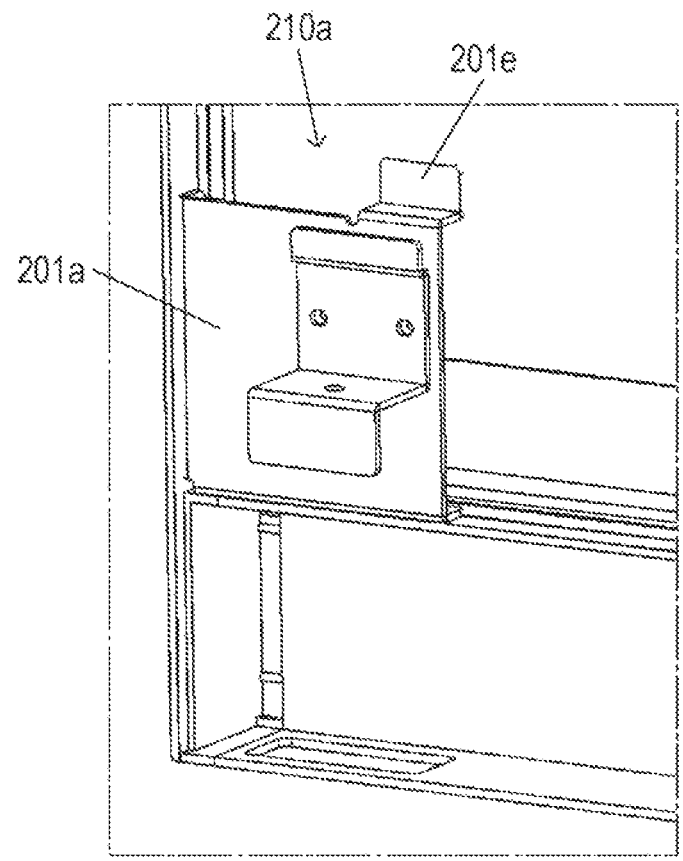
FIG. 19D is a perspective view illustrating a state in which the corner reinforcement plate and the board mounting plate are fixedly screwed to each other in a lower left corner portion of the electronic board according to the embodiment of the present disclosure.

The four corner reinforcement plates 210a attached to the corner portions (four corners) have a common structure. FIG. 19A illustrates the corner reinforcement plate 210a disposed in the upper right corner portion, and FIG. 19B illustrates the corner reinforcement plate 210a disposed in the upper left corner portion. FIG. 19C illustrates the corner reinforcement plate 210a disposed in the lower right corner portion, and FIG. 19D illustrates the corner reinforcement plate 210a disposed in the lower left corner portion. The corner reinforcement plates 210a disposed in the corner portions have the common structure, and they are fixedly screwed in place after being rotated to be properly positioned in conformity with the corresponding corner portions.

Figure 20:
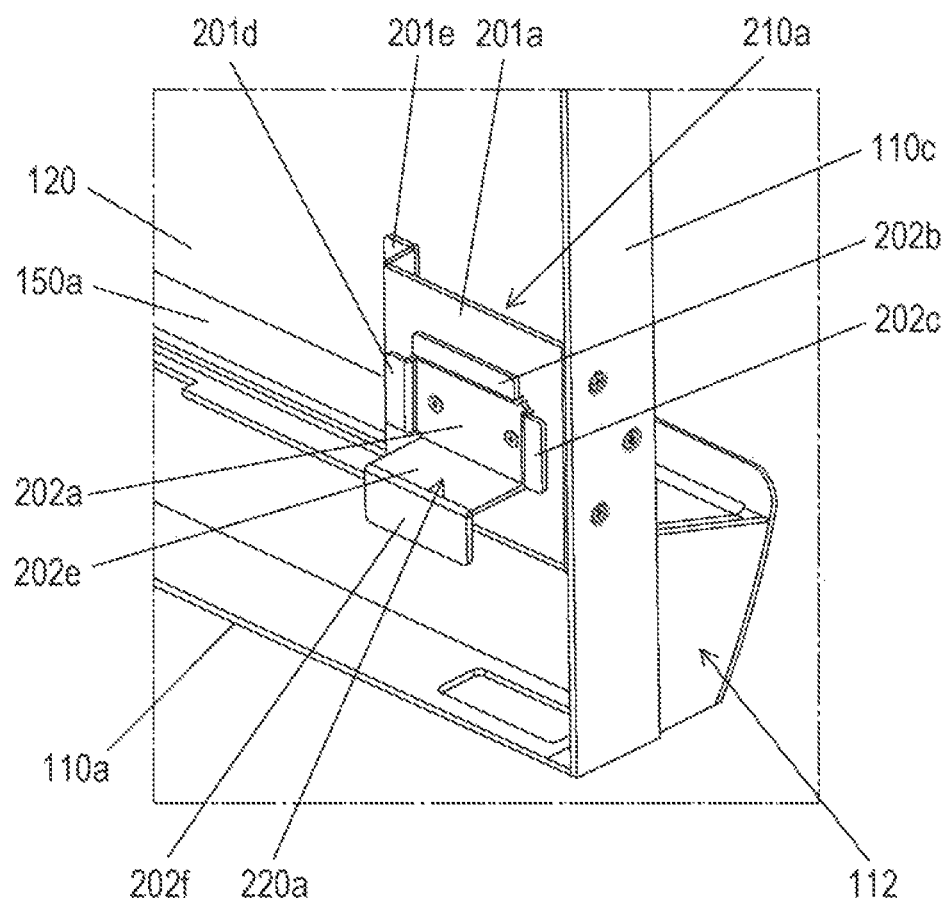
FIG. 20 is a perspective view illustrating a state in which the corner reinforcement plate and the board mounting plate are fixedly screwed to each other in a lower corner portion of the electronic board according to the embodiment of the present disclosure.

FIG. 20 is a perspective view illustrating a state in which the corner reinforcement plate 210a and the board mounting plate 220a are fixedly screwed to each other in a lower corner portion of the electronic board 10. Also in FIG. 20, the rear cover 130 is omitted. The corner reinforcement plate 210a is fixedly screwed to the lower bezel 110a and the right bezel 110c, and the chassis retaining portion 201e supports the chassis 120 while pressing the chassis 120 from the rear side. The bottom surface portion 202a of the board mounting plate 220a is fixedly screwed to the top surface portion 201a of the corner reinforcement plate 210a, while the first rear cover retaining portion 202b, the second rear cover retaining portion 202c, and the third rear cover retaining portion 202d of the board mounting plate 220a support the rear cover 130 (see FIG. 15) from the rear side.

Figure 21A:
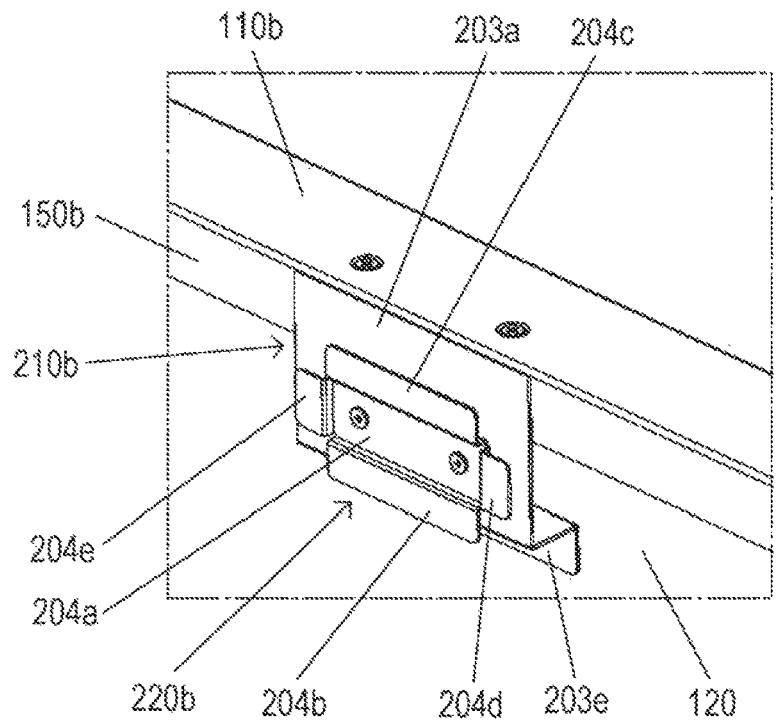
FIG. 21A is a perspective view illustrating a state in which a chassis fixing plate and a rear cover retaining plate are fixedly screwed to each other in an upper central portion of the electronic board according to the embodiment of the present disclosure.

FIG. 21A is a perspective view illustrating a state in which the chassis fixing plate 210b and the rear cover retaining plate 220b are fixedly screwed to each other in an upper central portion of the electronic board 10. Also in FIG. 21A, the rear cover 130 is omitted. The chassis fixing plate 210b is fixedly screwed to the upper bezel 110b, and its retaining portion 203e supports the chassis 120 while pressing the chassis 120 from the rear side. A bottom surface portion 204a of the rear cover retaining plate 220b is fixedly screwed to the top surface portion 203a of the chassis fixing plate 210b, while a first rear cover retaining portion 204b, a second rear cover retaining portion 204c, a third rear cover retaining portion 204d, and a fourth rear cover retaining portion 204e of the rear cover retaining plate 220b support the rear cover 130 (see FIG. 15) from the rear side.

Figure 21B:
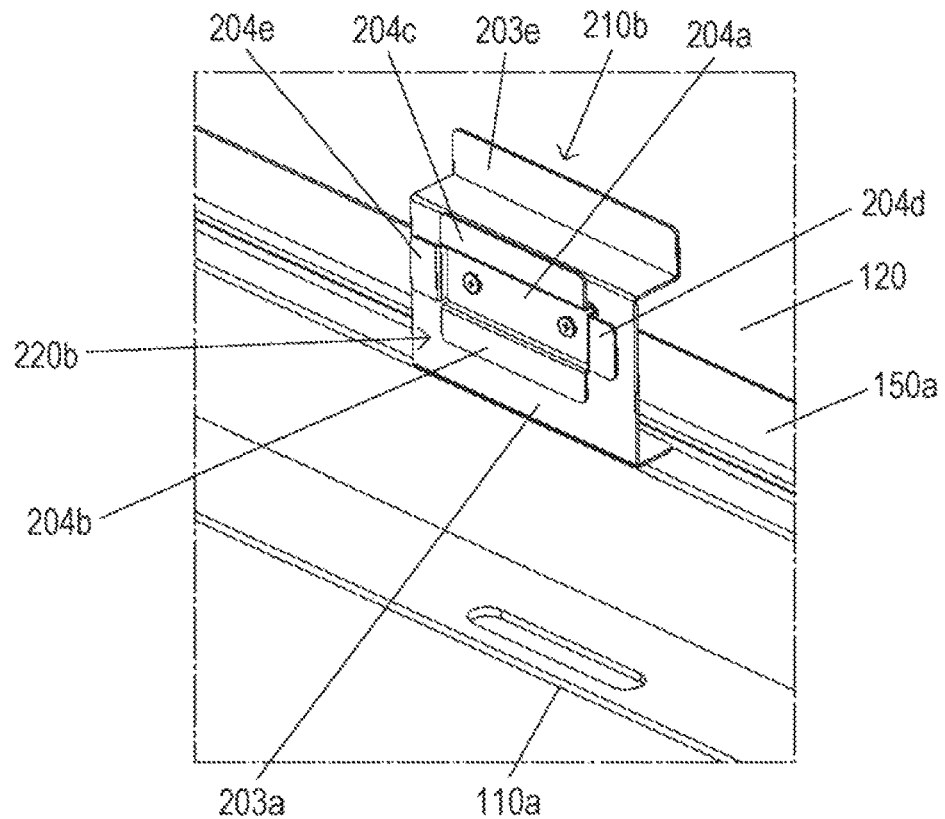
FIG. 21B is a perspective view illustrating a state in which the chassis fixing plate and the rear cover retaining plate are fixedly screwed to each other in a lower central portion of the electronic board according to the embodiment of the present disclosure.

FIG. 21B is a perspective view illustrating a state in which the chassis fixing plate 210b and the rear cover retaining plate 220b are fixedly screwed to each other in a lower central portion of the electronic board 10. Also in FIG. 21B, the rear cover 130 is omitted. The chassis fixing plate 210b is fixedly screwed to the lower bezel 110a, and its retaining portion 203e supports the chassis 120 while pressing the chassis 120 from the rear side. The bottom surface portion 204a of the rear cover retaining plate 220b is fixedly screwed to the top surface portion 203a of the chassis fixing plate 210b, while the first rear cover retaining portion 204b, the second rear cover retaining portion 204c, the third rear cover retaining portion 204d, and the fourth rear cover retaining portion 204e of the rear cover retaining plate 220b support the rear cover 130 (see FIG. 15) from the rear side.

Figure 22:
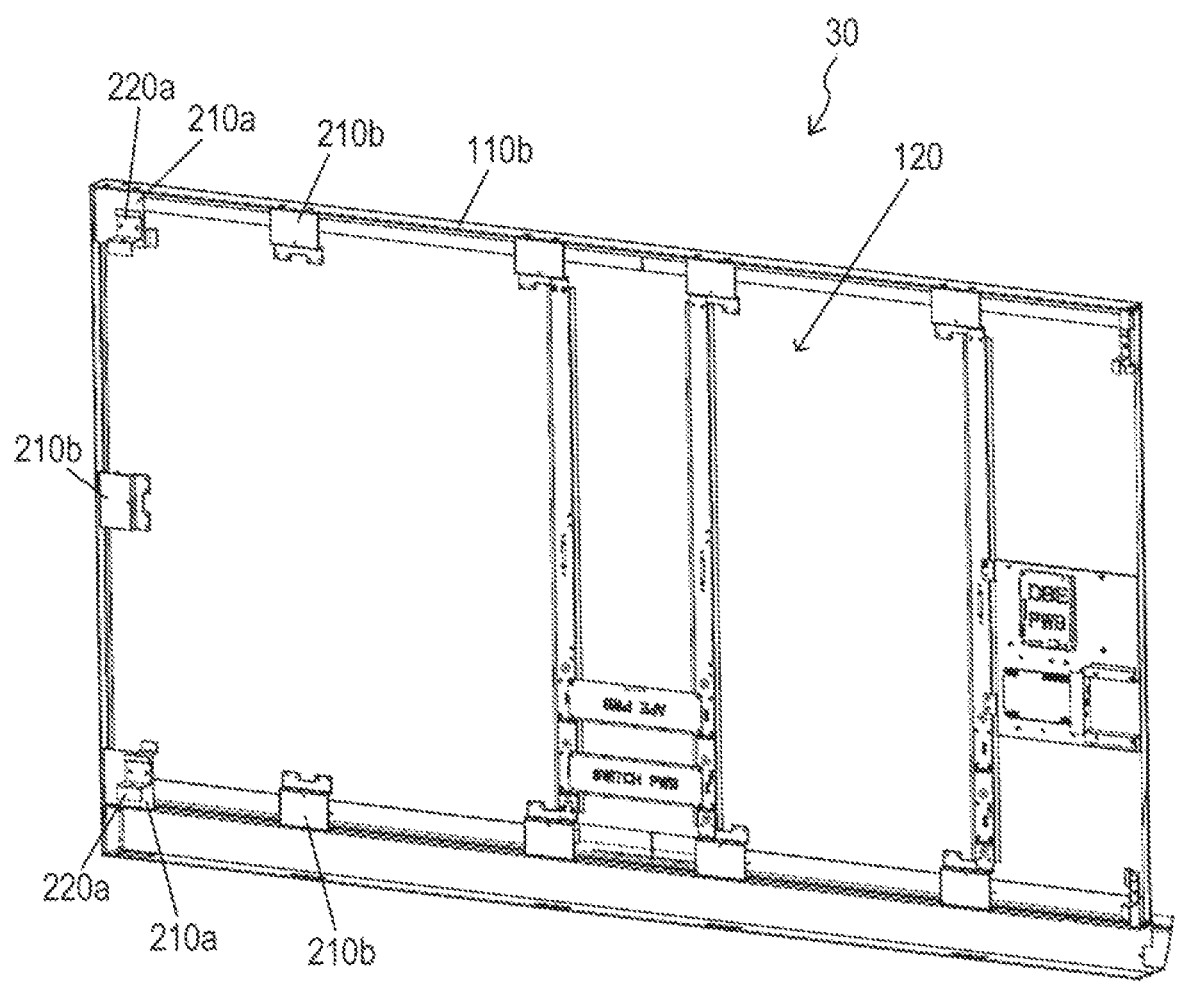
FIG. 22 is a perspective view looking, from the rear side, the electronic board according to the embodiment of the present disclosure.

The rear cover retaining plate 220b may be omitted. In such a case, as illustrated in FIG. 22, the rear cover 130 is supported at the rear surface by the board mounting plates 220a in the corner portions (for corners) and is fixed to the chassis fixing plates 210b in a central portion by using screws, for example. When the rear cover retaining plate 220b is omitted, the number of parts of the electronic board 10 can be reduced. Furthermore, there is no necessity of forming the openings 130a corresponding to the rear cover retaining plates 220b in the rear cover 130. The electronic board 10 is not limited to the structure illustrated in FIG. 14, and it may have the structure illustrated in FIG. 22.

First Fixing Method for Sensor Boards

A first fixing method for the sensor boards 150a, 150b and 150c will be described below. The sensor boards 150a and 150b disposed along long sides (in lower and upper regions) of the electronic board 10 are disposed on the rear side of the chassis 120, and the sensor board 150c disposed along a short side (e.g., in a right region) of the electronic board 10 is disposed on the lateral side of the chassis 120.

In more detail, as illustrated in FIG. 9, in a lower end region of the chassis 120, the sensor board 150a is disposed on the rear surface of the chassis 120 by turning the sensor sheet 150 through 180 degrees to entirely cover a lower end (lower surface) of the chassis 120. A buffer material 160a is disposed (in a space S2 (see FIG. 10)) between the sensor board 150a disposed on the rear surface of the chassis 120 and the corner reinforcement plate 210a supporting the rear surface of the chassis 120. More specifically, when the corner reinforcement plate 210a is fixedly screwed to the lower bezel 110a and the right bezel 110c, the buffer material 160a is disposed in a gap (space S2 in FIG. 10) formed between the top surface portion 201a of the corner reinforcement plate 210a and the rear surface of the chassis 120. The buffer material 160a contacts and presses a top surface of the sensor board 150a. The chassis retaining portion 201e of the corner reinforcement plate 210a presses the chassis 120 from the rear side in a region of the rear surface of the chassis 120 where the sensor board 150a is not disposed. As a result, the sensor board 150a is supported in a state pushed (pressed) by the buffer material 160a toward the front side. Moreover, the sensor unit 10b is sandwiched between the corner reinforcement plate 210a and the bezel 110.

As illustrated in FIG. 9, in an upper end region of the chassis 120, the sensor board 150b is disposed, similarly to the sensor board 150a, on the rear surface of the chassis 120 by turning the sensor sheet 150 through 180 degrees to entirely cover an upper end (upper surface) of the chassis 120. As illustrated in FIG. 12, a buffer material 160b is disposed (in a space S2 (see FIG. 11)) between the sensor board 150b disposed on the rear surface of the chassis 120 and the corner reinforcement plate 210a supporting the rear surface of the chassis 120. More specifically, when the corner reinforcement plate 210a is fixedly screwed to the upper bezel 110b and the right bezel 110c, the buffer material 160b is disposed in a gap (space S2 in FIG. 11) formed between the top surface portion 201a of the corner reinforcement plate 210a and the rear surface of the chassis 120. The buffer material 160b contacts and presses a top surface of the sensor board 150b. The chassis retaining portion 201e of the corner reinforcement plate 210a presses the chassis 120 from the rear side in a region of the rear surface of the chassis 120 where the sensor board 150b is not disposed. As a result, the sensor board 150b is supported in a state pushed (pressed) by the buffer material 160b toward the front side. Moreover, the sensor unit 10b is sandwiched between the corner reinforcement plate 210a and the bezel 110. The buffer materials 160a and 160b may be elastic members made of rubber, for example, but they are each desirably a conducting member having electrical conductivity, such as a gasket or a grounding spring. Using the conducting members as the buffer materials 160a and 160b can make grounding of the sensor boards 150a and 150b more reliable, and can more effectively avoid EMI (Electro Magnetic Interference).

Also in a portion (e.g., a central portion) other than the corner portion, as illustrated in FIG. 13, the buffer material 160b contacts and presses the top surface of the sensor board 150b. The retaining portion 203e of the chassis fixing plate 210b presses the chassis 120 from the rear side in a region of the rear surface of the chassis 120 where the sensor board 150b is not disposed. As a result, the sensor board 150b is supported in a state pushed (pressed) by the buffer material 160b toward the front side. Moreover, the sensor unit 10b is sandwiched between the chassis fixing plate 210b and the bezel 110.

As illustrated in FIG. 8, in a right end region (right side region) of the chassis 120, the sensor board 150c is disposed on a lateral surface of the chassis 120 by curving the sensor sheet 150 at the right end of the chassis 120 to turn through 90 degrees. A buffer material 161c is disposed between the sensor board 150c disposed on the lateral surface of the chassis 120 and the right bezel 110c. As a result, the sensor board 150c is supported in a state pushed (pressed) by the buffer material 161c toward the lateral surface. As with the buffer materials 160a and 160b, the buffer material 161c may be elastic members made of rubber, for example, but it is desirably a conducting member having electrical conductivity, such as a gasket or a grounding spring. Using the conducting member as the buffer material 160c can make grounding of the sensor board 150c more reliable, and can more effectively avoid the EMI.

With the above-described structure, the sensor boards 150a and 150b are supported at the rear surface of the chassis 120 by the buffer materials 160a and 160b that are disposed in the gaps (spaces S2) formed between the chassis 120 and the corner reinforcement plate 210a and between the chassis 120 and the chassis fixing plate 210b, respectively. The sensor board 150c is supported at the lateral surface of the chassis 120 by the buffer material 160c that is disposed in the gap formed between the chassis 120 and the bezel 110. Thus, the sensor boards 150a and 150b disposed along the long sides of the electronic board 10 and the sensor board 150c disposed along the short side of the electronic board 10 are disposed on the chassis 120 at different positions (i.e., on the rear surface and the lateral surface) from each other. Furthermore, the sensor boards 150a, 150b and 150c are movably supported (held) by the buffer materials 160a, 160b and 161c, respectively, without being fixed to the chassis 120 or other components by screws or the likes. Therefore, even when the sensor unit 10b causes deformation, such as distortion, due to environmental change, for example, the sensor boards 150a, 150b and 150c are less affected by the deformation of the sensor unit 10b. It is hence possible to avoid troubles, such as damage and malfunction, which may be caused by deformations of the sensor boards 150a, 150b and 150c.

In the above-described structure, when the sensor boards 150a, 150b and 150c are disposed on the rear surface and the lateral surface of the chassis 120, the sensor sheet 150 is partially bent. In particular, when the sensor boards 150a and 150b are disposed on the rear surface of the chassis 120, the sensor sheet 150 is partially bent through 180 degrees. Accordingly, there is a possibility that the sensor sheet 150 may be damaged in bent portions (curved portions). In consideration of the above point, this embodiment further includes a structure for avoiding damage of the sensor sheet 150.

In more detail, as illustrated in FIGS. 9 and 10, a gap is formed between the lower end (lower surface) of the chassis 120 and the lower bezel 110a, and a flexible portion 151a is formed in the bent portion of the sensor sheet 150, which is present in the above gap. Similarly, a gap is formed between the upper end (upper surface) of the chassis 120 and the upper bezel 110b, and a flexible portion 151b is formed in the bent portion of the sensor sheet 150, which is present in the above gap. Thus, with the bent portions of the sensor sheet 150 having flexibility, when the sensor unit 10b is deformed, for example, the deformation of the sensor unit 10b can be absorbed by the flexible portions 151a and 151b. As a result, damage of the sensor sheet 150 can be avoided. In order to avoid the bent portions of the sensor sheet 150 from contacting with the lower bezel 110a and the upper bezel 110b, buffer materials 161a and 161b (see FIG. 9) are desirably disposed respectively at the lower end and the upper end of the chassis 120 between the bent portion of the sensor sheet 150 and the lower bezel 110a and between the bent portion of the sensor sheet 150 and the upper bezel 110b.

As an alternative, in the lower and upper regions of the chassis 120, the sensor boards 150a and 150b may be disposed on the lower and upper surfaces of the chassis 120 by curving the sensor sheet 150 at the lower and upper ends of the chassis 120 to turn through 90 degrees. In the right end region (right side region) of the chassis 120, the sensor board 150c may be disposed on the rear surface of the chassis 120 by turning the sensor sheet 150 through 180 degrees to entirely cover the right end (right lateral surface) of the chassis 120.

Second Fixing Method for Sensor Boards

A second fixing method for the sensor boards 150a, 150b and 150c will be described below with reference to FIGS. 10 and 11. A structure that the sensor boards 150a and 150b are disposed on the rear surface of the chassis 120 and supported by the buffer materials 160a and 160b, respectively, and a structure that the sensor board 150c is disposed on the lateral surface of the chassis 120 and supported by the buffer material 161c are similar to the structures described in the above first fixing method.

As illustrated in FIG. 10, the writing board 10a, the sensor sheet 150, and the chassis 120, which constitute the sensor unit 10b, are bonded and fixed together such that the lower end of the chassis 120 is positioned above the lower end of the writing board 10a. When the integral sensor unit 10b is mounted to the lower bezel 110a, the lower end of the writing board 10a is placed on and supported by a rest portion 110h of the lower bezel 110a. In other words, the sensor unit 10b is supported with the lower end of the writing board 10a placed on the rest portion 110h of the lower bezel 110a. Therefore, the load (dead weight) of the sensor unit 10b is applied to the rest portion 110h. Thus, a gap S1 is formed between the lower end of the chassis 120 and the lower bezel 110a. Furthermore, the flexible portion 151a is formed in the bent portion of the sensor sheet 150 depending on the gap S1. The flexible portion 151a is bent, for example, with a predetermined curvature radius depending on the gap S1.

The rest portion 110h may be positioned at a higher level than a portion of the lower bezel 110a, the portion opposing to the lower end of the chassis 120. In that case, the sensor unit 10b may be bonded and fixed such that the lower end of the chassis 120 and the lower end of the writing board 10a locate at the same height (in flush). With such a structure, the gap S1 can also be formed between the lower end of the chassis 120 and the lower bezel 110a.

As illustrated in FIG. 11, a gap (space S3) is formed between the upper end of the chassis 120 and the upper bezel 110b. Thus, the flexible portion 151b bent with a predetermined curvature radius depending on the space S3 is formed in the bent portion of the sensor sheet 150. The sizes of the spaces S1 and S3 are set to optimum values by appropriately adjusting a vertical length of the chassis 120.

According to the above-described second fixing method, a curve formed by the bent portion of the sensor sheet 150 can be moderated (namely, the curvature radius of the bent portion can be increased). As a result, damage of the sensor sheet 150 can be reliably avoided.

Structure of Chassis

The sensor sheet 150 is in the form of a film and has flexibility. Furthermore, the writing board 10a is made of a resin material having a thickness of about several millimeters to reduce the total weight of the electronic board 10 and is apt to flex. In order to suppress flexing of the sensor sheet 150 and the writing board 10a, the sensor sheet 150 and the writing board 10a are bonded to the chassis 120. By integrally forming the writing board 10a, the sensor sheet 150, and the chassis 120 with each other, the sensor unit 10b has a structure being hard to flex.

The chassis 120 also has the function of avoiding reduction in detection accuracy of the position coordinates, which may be caused by the influence of noise. More specifically, the sensor sheet 150 is constituted by copper wirings having low wiring resistance and is susceptible to the influence of noise. In particular, when metal materials, such as the metal fittings (i.e., the corner reinforcement plate 210a and the chassis fixing plate 210b) used for fixing the sensor unit 10b, are positioned close to the sensor sheet 150, the sensor sheet 150 tends to be affected by noise from those metal materials. In consideration of the above point, a thickness t1 (see FIG. 11) of the chassis 120 is desirably set to a value at which the sensor sheet 150 is less affected by the noise, e.g., about 15 mm to 20 mm. Taking into account a demand for thinning of the total size as well, the thickness t1 is more desirably set to about 15 mm.

Structures of Power Supply and Connection Terminal

Figure 24:
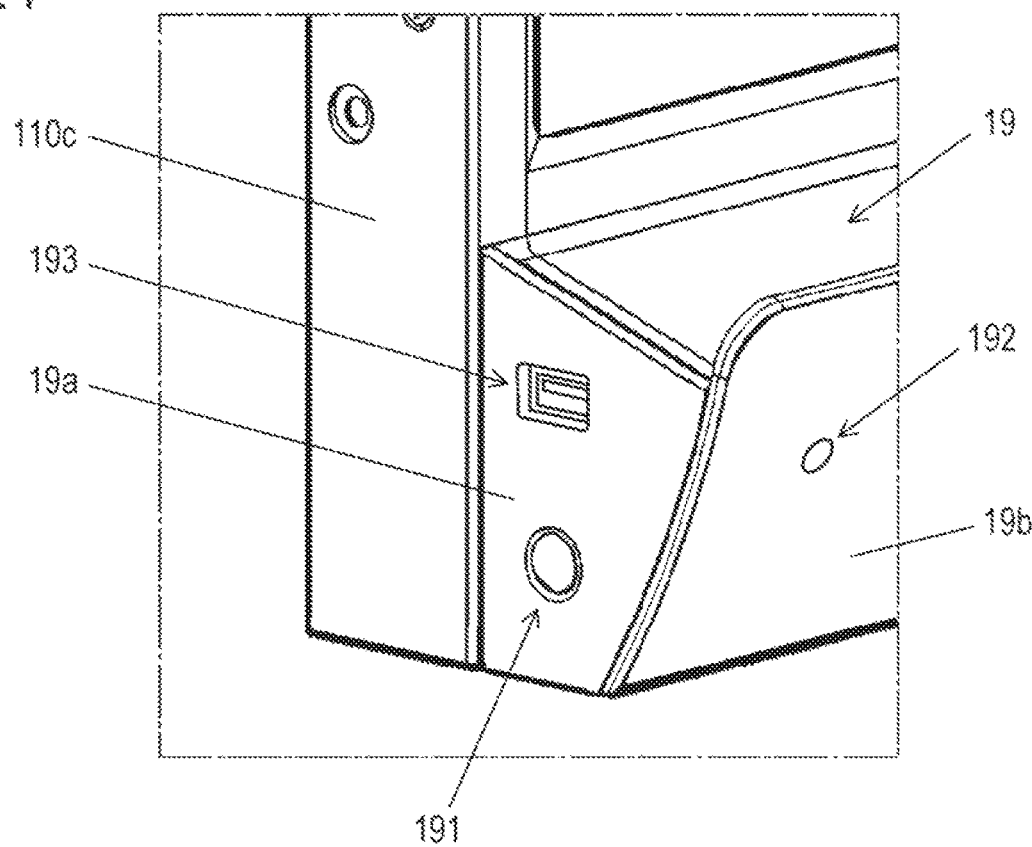
FIG. 24 is a perspective view illustrating a structure of a pen receiving pocket, including a power supply and a connection terminal, of the electronic board according to the embodiment of the present disclosure.

As illustrated in FIG. 24, the electronic board 10 further includes a power supply button 191 for turning ON or OFF a power supply of the electronic board 10, a LED 192 (indicator) (example of an annunciator in the present disclosure) for informing (displaying) a state (ON or OFF state) of the power supply of the electronic board 10 to the outside, and a connection terminal 193 (interface terminal) for connection to a storage medium that stores data files produced in the electronic board 10, information input with a human finger or the pen 30, and so on. The power supply button 191 and the connection terminal 193 are examples of operating units in the present disclosure. The operating units in the present disclosure may include an adjustment unit for adjusting a display state (such as brightness and luminance) of the electronic board 10, an input terminal through which an external signal is input, an output terminal through which an internal signal is output, function buttons used for executing various functions of software installed in the electronic board 10, etc.

Electric power for the electronic board 10 is supplied through a power supply cable (not illustrated), for example. The user can bring the electronic board 10 into the ON state by pressing the power supply button 191. Upon the user pressing the power supply button 191 when the electronic board 10 is in the ON state, the electronic board 10 is turned to the OFF state. For instance, the LED 192 is lit up when the electronic board 10 is in the ON state, and is lit out when the electronic board 10 is in the OFF state.

The above-mentioned storage medium is, for example, a USB memory, an SD memory card, a CD-ROM, or a DVD-ROM. When the storage medium is a USB memory, the connection terminal 193 is constituted by a USB terminal. When the storage medium is an SD memory card, the connection terminal 193 is constituted by an SD card slot. When the storage medium is a CD-ROM or a DVD-ROM, the connection terminal 193 is constituted by a USB terminal, for example, and is connected to an external drive for the CD-ROM or the DVD-ROM via a USB cable. The connection terminal 193 in FIG. 24 represents the USB terminal. The connection terminal 193 may be a terminal to which devices (including a wireless or wired communication device, a communication cable, etc.) for sending the above-described data files, input information and so on to an external device are connected.

The power supply button 191 and the connection terminal 193 are disposed in a lateral portion 19a of the pen receiving pocket 19, and the LED 192 is disposed in a front portion 19b of the pen receiving pocket 19.

Figure 25:
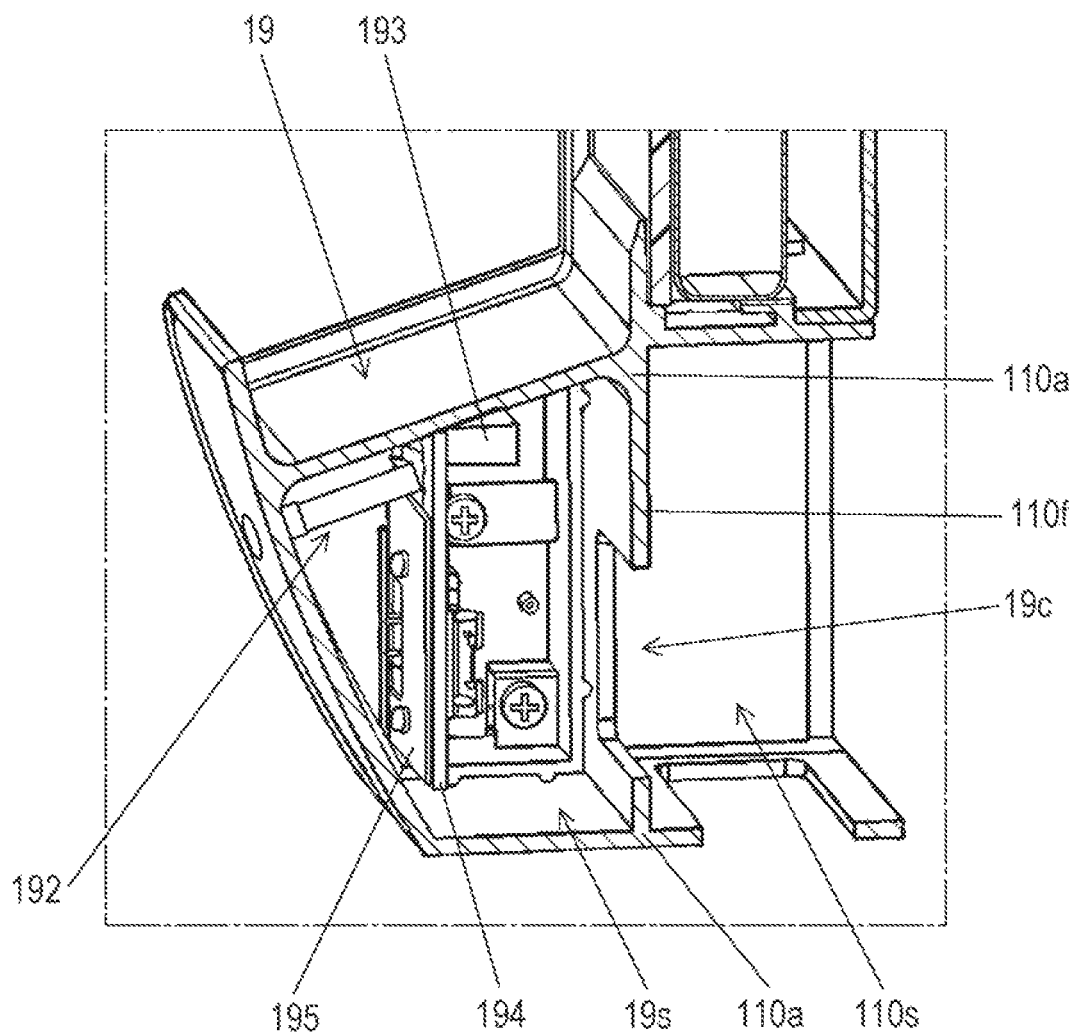
FIG. 25 is a sectional perspective view illustrating an internal structure of the pen receiving pocket, including the power supply and the connection terminal, of the electronic board according to the embodiment of the present disclosure.

As illustrated in FIG. 25, components constituting the power supply button 191, the LED 192, and the connection terminal 193 are disposed within an inner space under (on the backside of) the pen receiving pocket 19, i.e., a space 19s inside the lower bezel 110a. Furthermore, a circuit board 194 on which circuits for supplying various signals to the power supply button 191, the LED 192, and the connection terminal 193 are mounted is disposed in the space 19s and is attached to a metal fitting 195 that is fixedly screwed to a housing of the pen receiving pocket 19. The lateral portion 19a of the pen receiving pocket 19 may be formed of a cap (lid), and the power supply button 191, the LED 192, the connection terminal 193, the circuit board 194, and the metal fitting 195 may be attached to the cap. In that case, the cap is fixedly fitted to the lateral surface of the pen receiving pocket 19.

Figure 26:
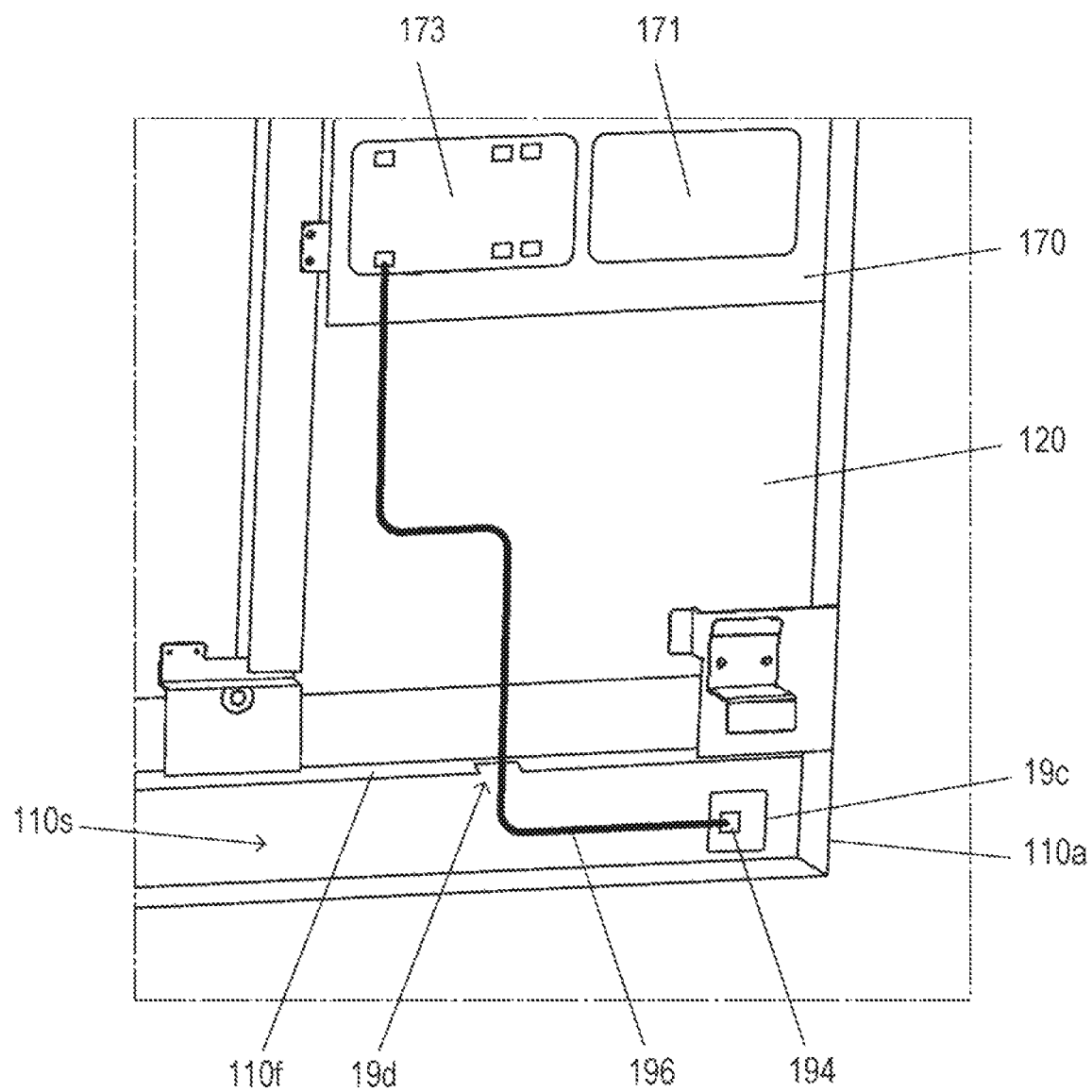
FIG. 26 is a perspective view when looking, from the rear side, a portion of the electronic board according to the embodiment of the present disclosure, the portion including the power supply and the connection terminal.

An opening 19c (see FIGS. 25 and 26) is formed in the lower bezel 110a and, as illustrated in FIG. 26, a cable 196 connected to the circuit board 194 is introduced to the space 110s in the lower bezel 110a through the opening 19c. Moreover, the cable 196 is introduced to the rear side of the chassis 120 through a cutout 19d that is formed in a partition wall 110f the lower bezel 110a, and is connected to the interface board 173 after extending along the rear surface of the chassis 120.

In an electronic board of related art, a power supply, a connection terminal, etc. are disposed in a front surface of the electronic board (e.g., laterally of a writing board). Such a related-art structure increases a frame size of the electronic board. On the other hand, in the electronic board 10 according to this embodiment, the power supply button 191 and the connection terminal 193 are disposed in the lateral portion 19a of the pen receiving pocket 19. Therefore, the frame size of the electronic board 10 can be reduced. When the commercially available pen 30 is used, foreign matters, such as debris generated from the pen 30, may be accumulated in the pen receiving pocket 19. Even in such a case, since the power supply button 191 and the connection terminal 193 are disposed in the lateral portion 19a of the pen receiving pocket 19, the debris can be avoided from adhering to the power supply button 191 and the connection terminal 193.

Furthermore, in the electronic board 10 according to this embodiment, the partition wall 110f (see FIGS. 25 and 26)

is disposed between the inner space (space 19s) where the circuit board 194 including the power supply button 191, the LED 192, and the connection terminal 193 are disposed and the space where the sensor sheet 150 and the various circuit boards for detecting the contact point are disposed. It is hence possible to reduce the influence of noise that the sensor sheet 150 and the various circuit boards may receive from the power supply button 191, the LED 192, and the connection terminal 193. The circuit board 194 including the power supply button 191, the LED 192, and the connection terminal 193 may be disposed in the space 19s or the space 110s (see FIG. 26).

The power supply button 191 and the connection terminal 193 may be disposed on the front portion 19b (see FIG. 24) of the pen receiving pocket 19 like the LED 192. When the pen receiving pocket 19 is made of aluminum and the lateral portion 19a is made of resin and fitted to the pen receiving pocket 19, the power supply button 191 and the connection terminal 193 are desirably disposed in the lateral portion 19a from the viewpoint of easiness in assembly and safety.

Structure of Sensor Boards

The sensor boards 150a, 150b and 150c are susceptible to the influence of noise because copper wirings (sensor wirings 152) having low wiring resistance are disposed on those sensor boards.

Figure 27A:
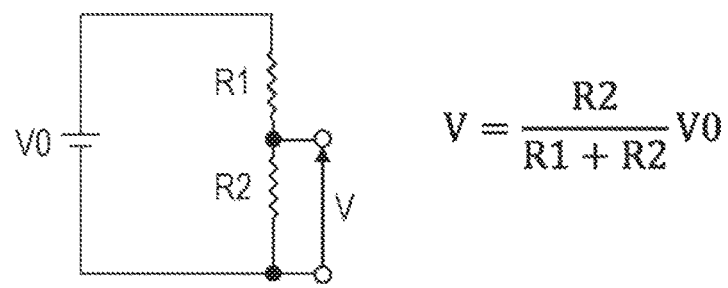
FIG. 27A is a circuit diagram of a general serial resistance.
Figure 27B:
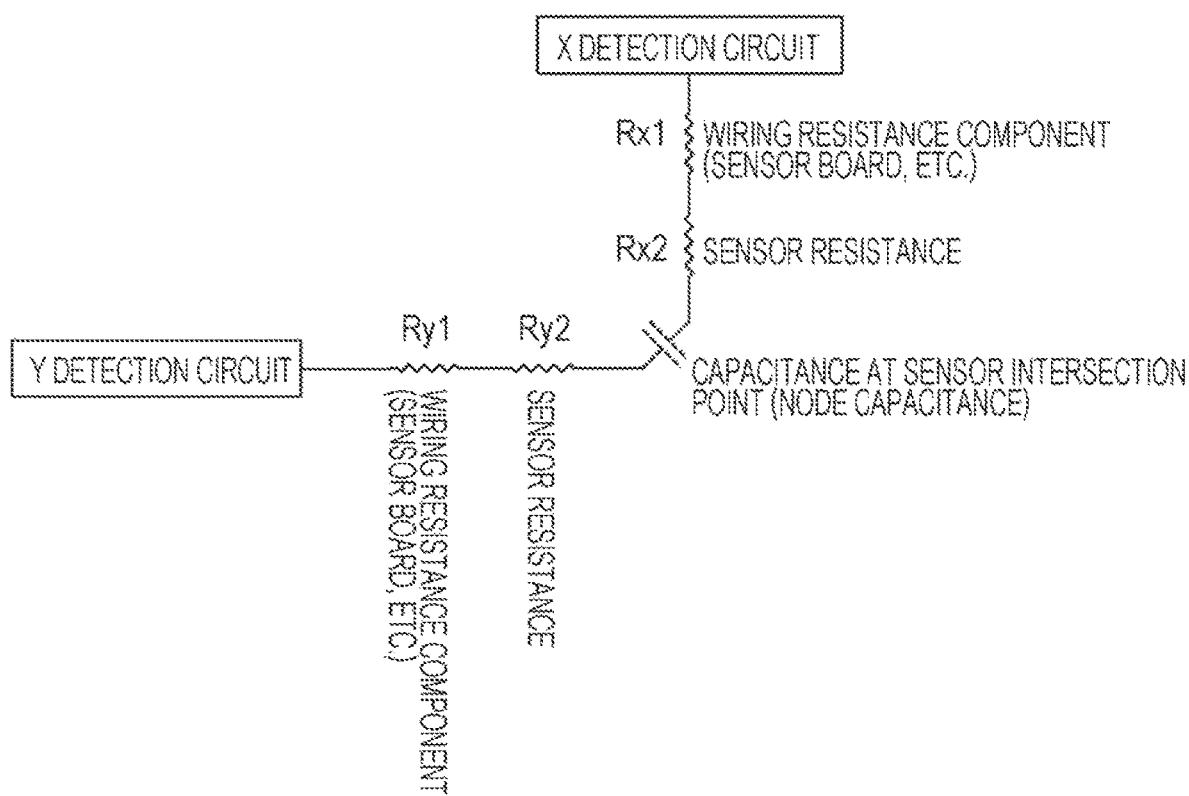
FIG. 27B is a circuit diagram of a touch sensor circuit.

The influence of noise upon the sensor wirings 152 is discussed here. FIG. 27A is a circuit diagram of a general serial resistance. FIG. 27B is a circuit diagram in which a serial resistance circuit in FIG. 27A is replaced with a touch sensor circuit. An X detection circuit and a Y detection circuit sequentially perform sending and detection of a touch detection signal, and they operate as closed circuits.

A voltage between both ends of a resistance R2 is calculated in accordance with a resistance division ratio. Considering the case in which a resistance R1 is replaced with the wiring resistance of a path up to a touch sensor in a touch panel circuit and the resistance R2 is replaced with the resistance component of the touch sensor itself, it is understood that the wiring resistance of the sensor wirings (copper wirings) having a resistance value, which is about 1/100 of the value in a metal mesh sensor of related art, has a large contribution to voltage (namely that a voltage between both ends of the resistance R1 is high). This implies that, assuming a power supply V0 to be replaced with a noise source, the influence of noise upon the resistance R1, i.e., the wiring resistance (of the wirings in the sensor board, etc.) of the path up to the touch sensor, is very large. Accordingly, countermeasures to the noise are to be taken for the sensor wirings disposed on the sensor board.

The sensor boards 150a, 150b and 150c in the embodiment of the present disclosure have the structure susceptible to the influence of noise. Because the sensor boards 150a, 150b and 150c have the same structure, the following description is made in connection with the sensor board 150a, for example.

Figure 28A:
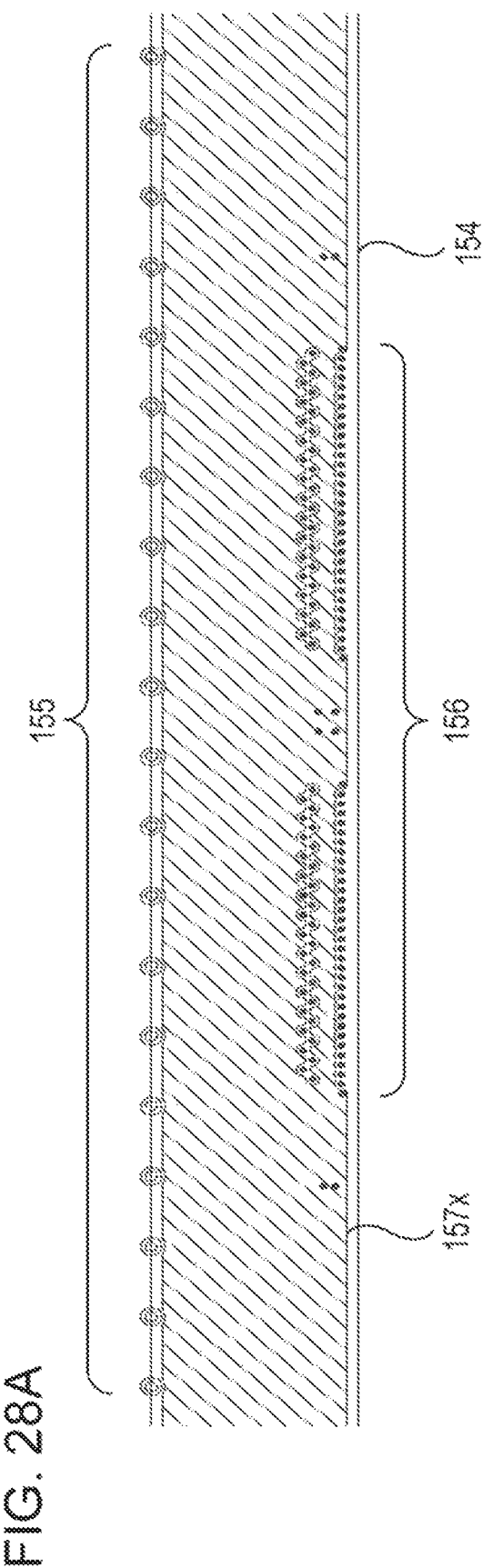
FIGS. 28A and 28B illustrate a structure of a sensor board in the electronic board according to the embodiment of the present disclosure.

FIGS. 28A, 28B, 29A and 29B illustrate the structure of the sensor board 150a. The sensor board 150a has a four-layer structure. FIG. 28A represents a first layer. Terminals 155 to which electrode lines (X parallel electrode lines 13x) are connected, and connector connection portions 156 are formed on a base member 154. Furthermore, a shield layer 157x (example of a first shield layer in the present disclosure) made of a copper material is solidly formed on an entire surface (rear surface; corresponding to a first surface in the present disclosure) of the base member 154.

Figure 28B:
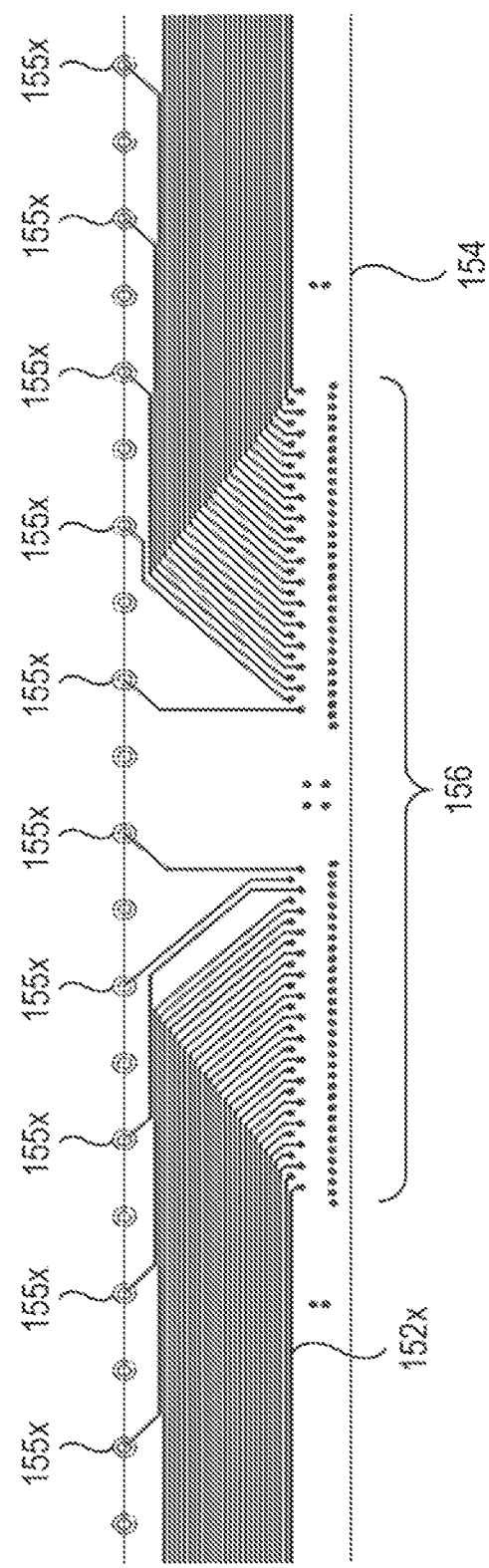

FIG. 28B represents a second layer. Sensor wirings 152x (example of first sensor wirings in the present disclosure) are pattern-formed on a front surface of the base member 154 (corresponding to a second surface in the present disclosure). The sensor wirings 152x are each electrically connected to a terminal 155x at an odd-number position.

Figure 29A:
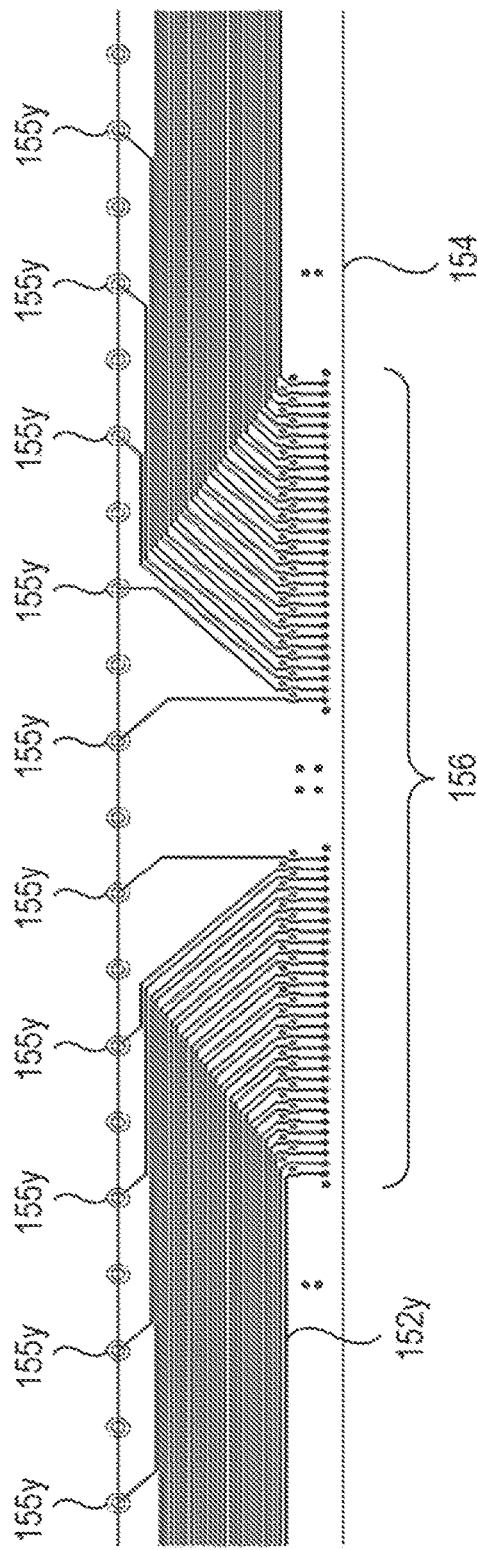
FIGS. 29A and 29B illustrate the structure of the sensor board in the electronic board according to the embodiment of the present disclosure.

FIG. 29A represents a third layer. On the front-surface side of the base member 154, sensor wirings 152y (example of second sensor wirings in the present disclosure) are pattern-formed above the sensor wirings 152x with an insulating layer interposed therebetween. The sensor wirings 152y are each electrically connected to a terminal 155y at an even-number position.

Figure 29B:
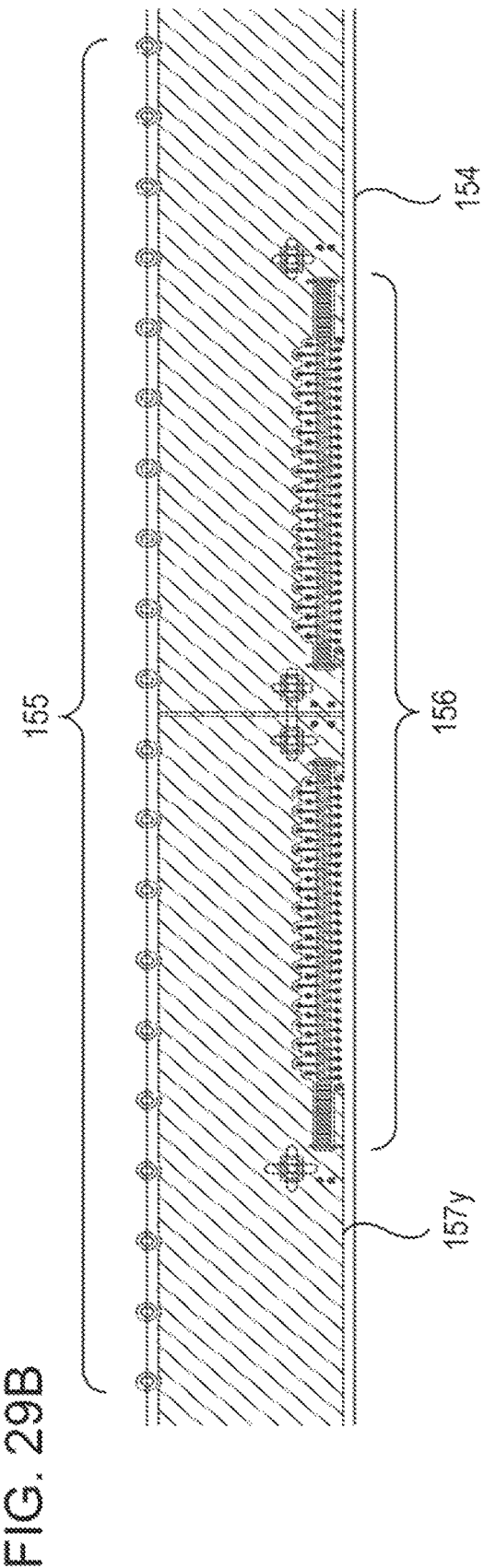

FIG. 29B represents a fourth layer. On the front-surface side of the base member 154, a shield layer 157y (example of a second shield layer in the present disclosure) made of a copper material is solidly formed on the sensor wiring 152y over an entire surface region.

The front surface and the rear surface of the sensor board 150a having the above-described four-layer structure are covered with the shield layers 157x and 157y, respectively. Therefore, the influence of noise upon the sensor wirings 152x and 152y of the sensor board 150a can be suppressed. It is hence possible to reduce the noise in the electronic board 10 with the simple structure, and to reduce the cost of the countermeasures for the noise. As a result, the electronic board 10 capable of reducing the cost with the simple structure can be realized.

Furthermore, in the sensor board 150a, since the adjacent sensor wirings 152x and 152y are disposed in different layers (i.e., the second and third layers), wiring failures caused by, for example, contact between the adjacent sensor wirings 152x and 152y can be avoided. In addition, since the sensor wirings 152x and 152y are alternately arranged, mutual capacitive coupling between the adjacent sensor wirings 152x and 152y (i.e., adjacent channels) can be made uniform. While, in this embodiment, the sensor wirings 152x and 152y are arranged alternately (at every other positions) in the second and third layers, respectively, the arrangement of the sensor wirings is not limited to such an example, and the sensor wirings 152x and 152y may be arranged at every plural positions (e.g., every two positions) alternately.

The shield layers (157x and 157y) may be connected to a circuit ground or to a reference potential (ground) of a drive circuit for the touch panel. When the shield layers 157x and 157y are connected to the reference potential, there may occur a problem that a parasitic capacitance increases, namely a problem that a signal level attenuates due to capacitive coupling between signal lines sandwiched between ground layers having large areas and the ground layers (i.e., due to formation of a virtual capacitor). As one method of dealing with the above-described problem, it is conceivable, for example, to apply a dummy signal (i.e., a reference signal having the same frequency and the same phase as those of a touch panel drive signal) to the shield layers, and to cancel potential differences between the shield layers and the signal lines (sensor wirings 152x and 152y), thereby disabling generation of the parasitic capacitance while maintaining the shield effect. When an amount of attenuation of a signal level is not large so as to affect touch detection accuracy in practical use, there is no necessity of adopting the above-mentioned method.

Method of Mounting Electronic Board

Figure 23:
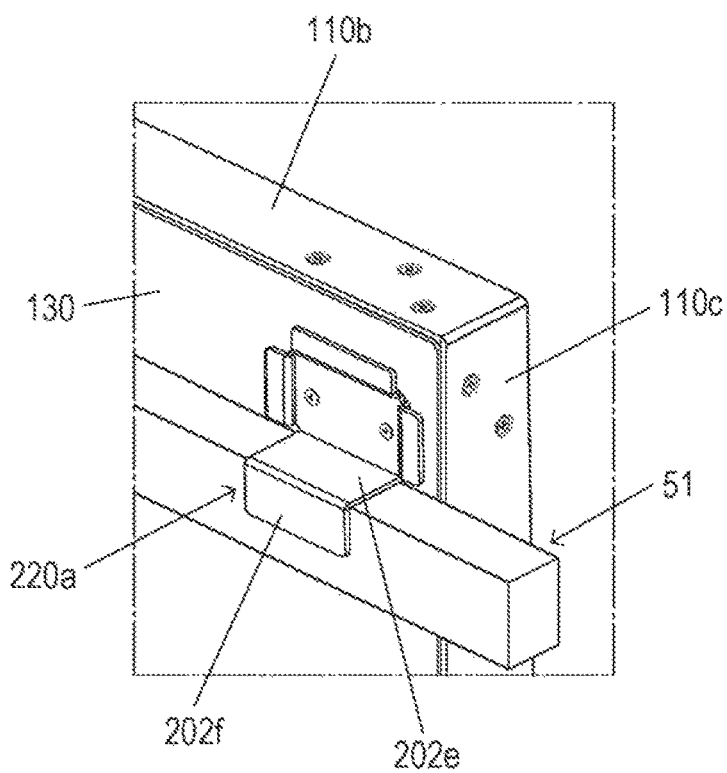
FIG. 23 is a perspective view illustrating a state in which the electronic board according to the embodiment of the present disclosure is mounted to a stand frame.

In use, the electronic board 10 is mounted, as illustrated in FIG. 23, to the frame 51 (example of a holding member in the present disclosure) of the stand 50 (see FIG. 2), for example, with the aid of the hanging portion 202e and the hooking portion 202f of each board mounting plates 220a. The board mounting plate 220a hung on the frame 51 is fixedly screwed to the corner reinforcement plate 210a that firmly holds the bezel 110 by screw fixing. Thus, the electronic board 10 is supported by the board mounting plates 220a that are fixedly screwed to the corner reinforcement plates 210a disposed at the corner portions (four corners). As a result, the electronic board 10 can be reliably mounted to the stand 50 in use, and the electronic board 10 is hard to deform due to the dead weight, etc.

The present disclosure contains subject matter related to that disclosed in Japanese Priority Patent Application JP 2018-123331 filed in the Japan Patent Office on Jun. 28, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic board detecting a contact position on a writing board, the electronic board comprising:
   the writing board;
   a sensor sheet including a plurality of first electrode lines extending in a first direction and a plurality of second electrode lines extending in a second direction that intersects the first direction;
   a chassis that fixes the sensor sheet;
   at least, one support member disposed on a rear side of the chassis and supporting the chassis; and
   a bezel constituting an outer frame of the electronic board,
   wherein the writing board, the sensor sheet, and the chassis are successively disposed in mentioned order and are fixed together into an integral unit,
   the at least one support member includes a top surface portion disposed to face a rear surface of the chassis with a predetermined interval therebetween, a lateral surface portion extending from the top surface portion toward the rear surface of the chassis and fixedly screwed to the bezel, and a chassis retaining portion extending from the top surface portion toward the rear surface of the chassis and being held in contact with the rear surface of the chassis, and
   the writing board, the sensor sheet, and the chassis formed into the integral unit are sandwiched between the chassis retaining portion and the bezel.

2. The electronic board according to claim 1, further comprising:
   a rear cover covering a rear surface of the electronic board; and
   an attachment member attaching the rear cover to the electronic board,
   wherein the attachment member includes a bottom surface portion inserted through an opening formed in the rear cover and fixedly screwed to the top surface portion of the at least one support member, and a rear cover retaining portion supporting the rear cover, and
   the rear cover is sandwiched between the top surface portion of the at least one support member and the rear cover retaining portion.

3. The electronic board according to claim 2, wherein the attachment member further includes a hanging portion to mount the electronic board to a holding member,
   wherein the electronic board, is supported with the hanging portion hanged on the holding member in use.

4. The electronic board according to claim 3, wherein, in the attachment member, the hanging portion is positioned lower than the bottom surface portion in a vertical direction.

5. The electronic board according to claim 1, wherein
   the at least one support member is one of a plurality of support members respectively disposed in a plurality of corner portions of the electronic board, and
   each of the plurality of support members includes a first lateral surface portion extending from the top surface portion toward the rear surface of the chassis and fixedly screwed to a first bezel constituting a portion of the bezel, the portion extending in the second direction, and a second lateral surface portion extending from the top surface portion toward the rear surface of the chassis and fixedly screwed to a second bezel constituting a portion of the bezel, the portion extending in the first direction.

6. The electronic board according to claim 1, wherein a first sensor board to which the plurality of first electrode lines are connected is connected to an end portion of the sensor sheet in the first direction, and a second sensor board to which the plurality of second electrode lines are connected is connected to an end portion of the sensor sheet in the second direction,
   the first sensor board is disposed on the rear surface of the chassis with the sensor sheet bent near the end portion of the sensor sheet in the first direction to cover an end portion of the chassis in the first direction,
   a buffer material is disposed between the top surface portion of the at least one support member and the chassis, and
   the first sensor board is supported on a rear side thereof by the buffer material.

7. The electronic board according to claim 1, wherein a first sensor board to which the plurality of first electrode lines are connected is connected to an end portion of the sensor sheet in the first direction, and a second sensor board to which the plurality of second electrode lines are connected is connected to an end portion of the sensor sheet in the second direction,
   the first sensor board is disposed on the rear surface of the chassis with the sensor sheet bent near the end portion of the sensor sheet in the first direction to cover an end portion of the chassis in the first direction,
   the first sensor board, and the second sensor board are disposed between the top surface portion of the at least one support member and the rear surface of the chassis, and
   the chassis retaining portion is held in contact with the rear surface of the chassis in a region of the rear surface of the chassis where the first sensor board and the second sensor board are not disposed.

8. An electronic board detecting a contact position on a writing board, the electronic board comprising:
   the writing board;
   a sensor sheet including a plurality of first electrode lines extending in a first direction and a plurality of second electrode lines extending in a second direction that intersects the first direction;
   a chassis that fixes the sensor sheet;
   a support member disposed on a rear side of the chassis and supporting the chassis; and
   a bezel constituting an outer frame of the electronic board,
   wherein the writing board, the sensor sheet, and the chassis are successively disposed in mentioned order and are fixed together into an integral unit,
   the support member includes a top surface portion, a lateral surface portion extending from the top surface portion toward a rear surface of the chassis and fixedly screwed to the bezel, and a chassis retaining portion held in contact with the rear surface of the chassis, the writing board, the sensor sheet, and the chassis formed into the integral unit are sandwiched between the chassis retaining portion and the bezel, a first sensor board to which the plurality of first electrode lines are connected is connected to an end portion of the sensor sheet in the first direction, and a second sensor board to which the plurality of second electrode lines are connected is connected to an end portion of the sensor sheet in the second direction, the first sensor board is disposed on the rear surface of the chassis with the sensor sheet bent near the end portion of the sensor sheet in the first direction to cover an end portion of the chassis in the first direction, a buffer material is disposed between the top surface portion of the support member and the chassis, and the first sensor board is supported on a rear side thereof by the buffer material.

* * * * *